US011156310B2

(12) United States Patent
Barten et al.

(10) Patent No.: US 11,156,310 B2
(45) Date of Patent: Oct. 26, 2021

(54) LINE GUIDE DEVICE, IN PARTICULAR FOR CLEAN ROOM APPLICATIONS, SHELL PORTIONS AND SUPPORT RIB STRUCTURE FOR SAME

(71) Applicant: igus GmbH, Cologne (DE)

(72) Inventors: Dominik Barten, Meckenheim (DE); Andreas Hermey, Hennef (DE); Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 5 days.

(21) Appl. No.: 16/821,418

(22) Filed: Mar. 17, 2020

(65) Prior Publication Data

US 2020/0224793 A1 Jul. 16, 2020

Related U.S. Application Data

(63) Continuation of application No. 15/512,269, filed as application No. PCT/EP2015/071449 on Sep. 18, 2015, now Pat. No. 10,591,089.

(30) Foreign Application Priority Data

Sep. 18, 2014 (DE) ................ 20 2014 104 458.2
Apr. 2, 2015 (DE) ................ 20 2015 101 688.3

(51) Int. Cl.
  *H02G 11/00* (2006.01)
  *F16L 3/015* (2006.01)
  *F16G 13/16* (2006.01)

(52) U.S. Cl.
  CPC .............. *F16L 3/015* (2013.01); *F16G 13/16* (2013.01); *H02G 11/006* (2013.01)

(58) Field of Classification Search
  CPC ........ H02G 3/04; H02G 3/0468; H02G 11/00; H02G 11/006; F16G 13/16
  (Continued)

(56) References Cited

U.S. PATENT DOCUMENTS 2,613,421 A ‡ 10/1952 Madsen ............. A44B 19/16
                                                    24/399
3,060,972 A ‡ 10/1962 Sheldon ............. A61B 1/0055
                                                    138/12

(Continued)

FOREIGN PATENT DOCUMENTS

CN   2917042     ‡ 6/2007
DE   1010486     ‡ 6/1957

(Continued)

OTHER PUBLICATIONS

English translation of the International Preliminary Report on Patentability dated Mar. 30, 2017, received in corresponding PCT Application No. PCT/EP2015/071449.‡

(Continued)

*Primary Examiner* — Patrick F Brinson
(74) *Attorney, Agent, or Firm* — Grossman, Tucker, Perreault & Pfleger, PLLC

(57) ABSTRACT

A line guide device for lines like for example cables, hoses or the like, in particular for a clean room application, which has a flexible sheath. The sheath is designed in the manner of a corrugated tube and has a corrugated profile for the purposes of flexibility. The sheath has an asymmetric bending characteristic in relation to curvature about the direction-changing axis and to opposite curvature such that the permitted bending sag is considerably less than the desired curvature. There is proposed a particular configuration of shell portions for constructing the sheath, in particular in respect of the corrugated profiles and the fixing of the shell (Continued)

portions. A further aspect concerns a supporting skeleton for a corrugated tube.

25 Claims, 12 Drawing Sheets

(58) Field of Classification Search
USPC ....... 138/121, 122, 120, 128, 154, 157, 106, 138/110; 59/78.1; 174/68.3
See application file for complete search history.

(56) References Cited

U.S. PATENT DOCUMENTS

| | | | |
|---|---|---|---|
| 4,228,825 A | | 10/1980 | Moritz et al. |
| 5,069,486 A ‡ | | 12/1991 | Kimura .................. F16G 13/10 138/12 |
| 5,980,409 A ‡ | | 11/1999 | Blase ................... H02G 11/006 474/21 |
| 6,708,480 B1 ‡ | | 3/2004 | Wehler .................. F16G 13/16 248/49 |
| 6,745,555 B2 ‡ | | 6/2004 | Hermey ................. F16G 13/16 248/49 |
| 6,773,297 B2 ‡ | | 8/2004 | Komiya .................. F16G 13/16 138/12 |
| 7,845,155 B2 ‡ | | 12/2010 | Jaeker .................... F16G 13/16 248/49 |
| 8,957,310 B2 ‡ | | 2/2015 | Kaihotsu ............. H02G 3/0475 174/68 |
| 9,464,689 B2 ‡ | | 10/2016 | Hermey ............... H02G 3/0468 |
| 2004/0026109 A1 ‡ | | 2/2004 | Suzuki ................... H02G 11/00 174/72 |
| 2012/0205498 A1 ‡ | | 8/2012 | Komiya ............... H02G 11/006 248/49 |

FOREIGN PATENT DOCUMENTS

| | | | |
|---|---|---|---|
| DE | 3016628 | ‡ | 11/1981 |
| DE | 29904796 | ‡ | 7/1999 |
| DE | 60204937 | ‡ | 4/2006 |
| DE | 202012010236 | ‡ | 11/2012 |
| DE | 202013101203 | ‡ | 5/2013 |
| DE | 102012000798 | ‡ | 7/2013 |
| DE | 102013105427 | ‡ | 11/2013 |
| EP | 0197546 | ‡ | 10/1986 |
| EP | 0803032 | ‡ | 6/2000 |
| EP | 1291996 | ‡ | 3/2003 |
| EP | 2142823 | ‡ | 6/2012 |
| GB | 2141091 | ‡ | 12/1984 |
| JP | 54-111123 | | 8/1979 |
| JP | 9-210142 | | 8/1997 |
| JP | 2000-184552 | ‡ | 6/2000 |
| JP | 2000-346251 | | 12/2000 |
| JP | 2002281627 | ‡ | 9/2002 |
| JP | 2004-248367 | ‡ | 9/2004 |
| JP | 2005-312256 | | 11/2005 |
| JP | 2006-149012 | | 6/2006 |
| JP | 2007252060 | ‡ | 9/2007 |
| JP | 2009254218 | ‡ | 10/2009 |
| JP | 2012-023877 | | 2/2012 |
| WO | WO-01/48885 | ‡ | 7/2001 |
| WO | WO-02/086349 | ‡ | 10/2002 |
| WO | WO-2005/071284 | ‡ | 8/2005 |
| WO | WO-2005/098267 | ‡ | 10/2005 |

OTHER PUBLICATIONS

PCT International Search Report dated Dec. 14, 2015, received in corresponding PCT Application No. PCT/EP2015/071449. English translation attached.‡

Office Action from related Japanese Appln. No. 2020-007968, dated Nov. 4, 2020. English translation attached.

‡ imported from a related application

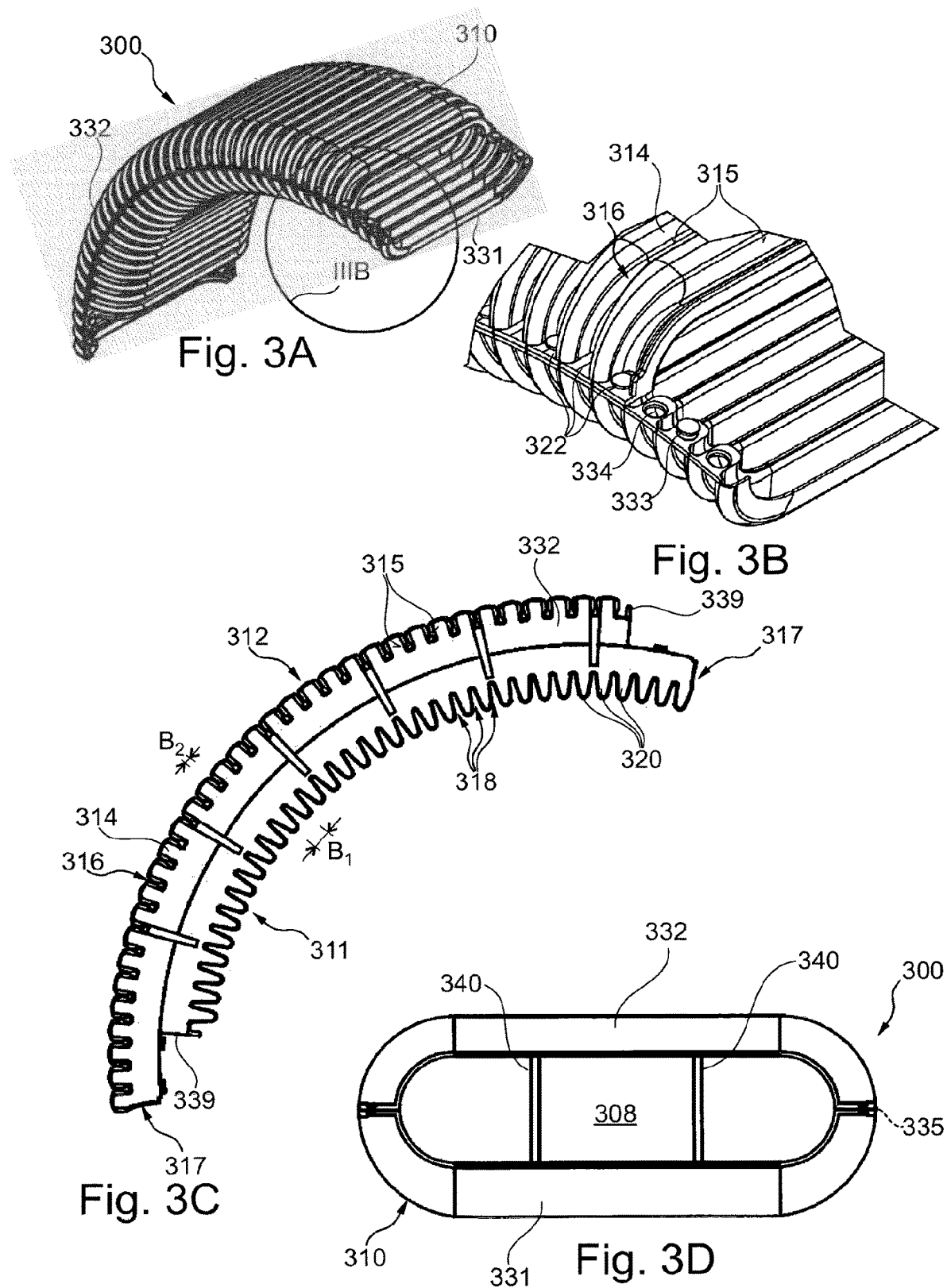

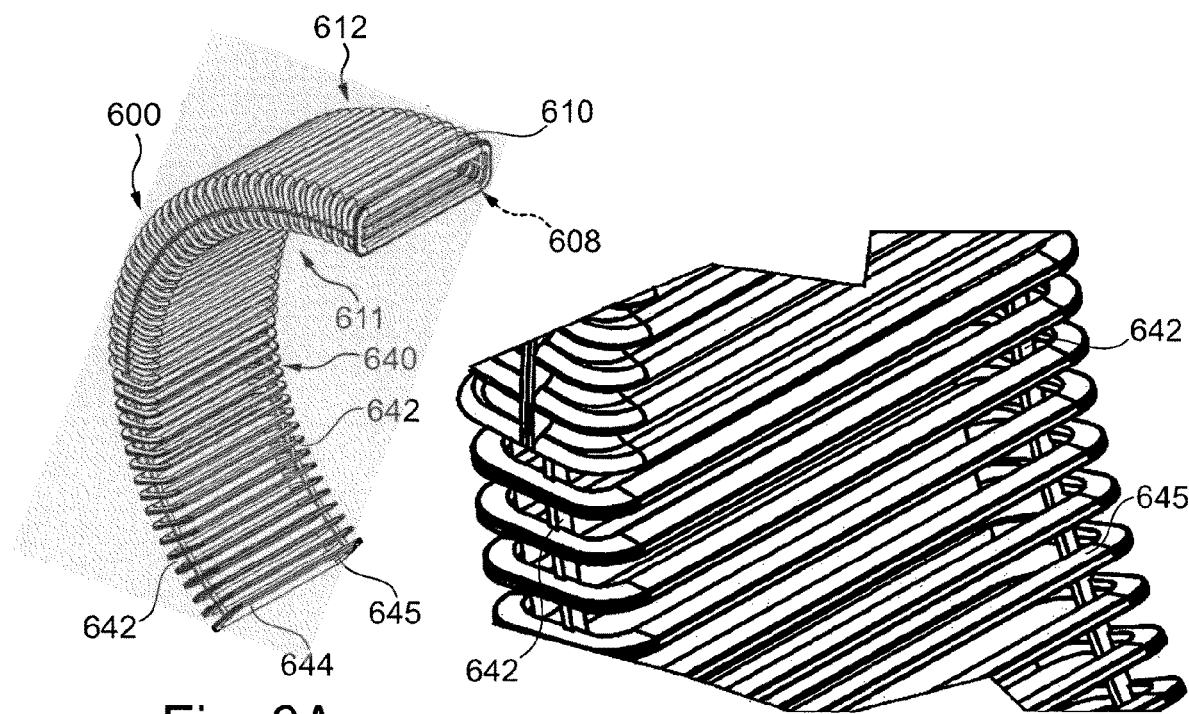
Fig. 6A
Fig. 6B
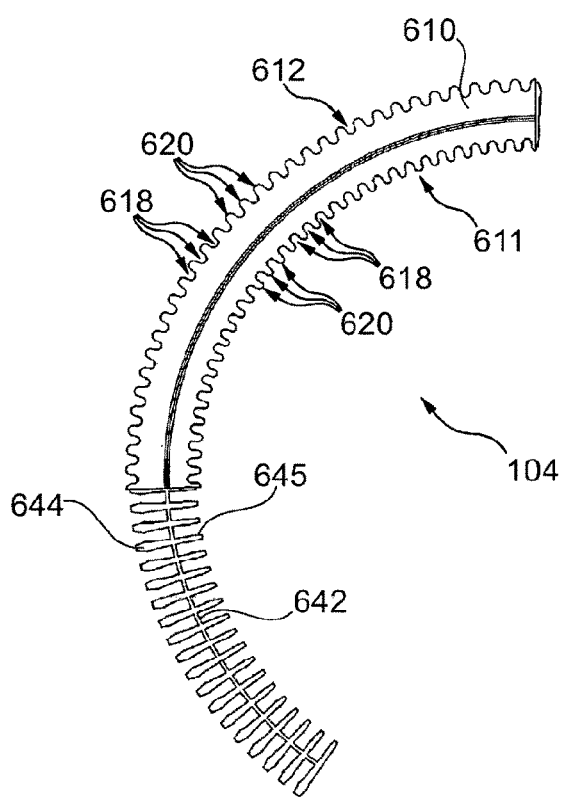
Fig. 6C

LINE GUIDE DEVICE, IN PARTICULAR FOR CLEAN ROOM APPLICATIONS, SHELL PORTIONS AND SUPPORT RIB STRUCTURE FOR SAME

CROSS-REFERENCE TO RELATED APPLICATIONS

This application is a continuation application of U.S. application Ser. No. 15/512,269 filed Jul. 17, 2017 which is a U.S. National Stage Completion of PCT/EP2015/071449 filed on Sep. 18, 2015 which claims priority to German Application Nos. 20 2014 104 458.2 filed on Sep. 18, 2014 and 20 2015 101 688.3 filed on Apr. 2, 2015.

FIELD

The present invention concerns a line guide device for lines like for example cables, hoses or the like, which has a first end for fixing to a stationary connecting location and a second end for fixing to a further connecting location moveable relative thereto. Between its ends the line guide device forms an upper run, a displaceable direction-changing curve, and a lower run. The direction-changing curve is curved or pivoted about a direction-changing axis, preferably with a predetermined radius of curvature, and is typically displaceable in the plane perpendicular to the direction-changing axis.

BACKGROUND

U.S. Pat. No. 5,069,486 A and EP 0 197 546 B1 describe an energy guide chain for three-dimensional movements, for example on a robot. In that case individual link members are composed of shell portions. They engage into each other forming a ball joint connection. Special seals can be present in the joints, to protect the guided lines for example from moisture. Such a chain however does not prevent abrasive particles from being given off, which are produced by the adjacent link members rubbing against each other.

In operation of a line guide device, abrasion generally inevitably occurs with time, that is to say small particles are produced caused by friction between the lines and/or the components of the line guide device.

The invention concerns in particular a line guide device for such applications in which abrasion is not to be produced. That is the case for example in a clean room application. U.S. Pat. No. 6,773,297 B1 and EP 1 319 865 B1 describe additional or intermediate frames which are mounted individually around the joint connections of a conventional energy guide chain and are operative to prevent abrasive particles from escaping. This too is complicated and expensive to produce and later handle. Unlike the solution disclosed in U.S. Pat. No. 2,012,205 498 A1 that approach cannot reduce the occurrence of abrasion particles.

A line guide device of the general kind involved here is previously known from German Utility Model DE 20 2013 101 203 U1 which has a flexible sheath in the manner of a corrugated tube. That corrugated tube-like sheath or envelope dust-tightly surrounds the interior of the line guide device, both in the longitudinal direction between the two ends and also in the peripheral direction. The unwanted discharge of abrasive particles is prevented in a simple but effective manner by the dust-tight sheath.

A substantial advantage of the structure in accordance with DE 20 2013 101 203 U1 is that the sheath can be subsequently fitted as a line guide to per se known energy guide chains, that is to say in that respect there is no need for special complicated and expensive structures for protecting the lines.

In this connection it is also already known for so-called cable protection tubes to be used as a line guide device of the general kind set forth here. These are generally used when the mechanical loading on the line guide device turns out to be relatively low. Thus for example German laid-open application DE 10 2012 000 798 A1 describes such a cable protection tube of an approximately rectangular cross-section, wherein an additional device is provided for dividing the interior into a plurality of tube regions for the various lines. That device has an elongate flexible carrier and separating ribs projecting radially therefrom. An embodiment provides that engagement elements on the separating ribs engage from the interior into troughs defined by the corrugated configuration in the protective tube and thereby prevent kinking. A disadvantage with the structure of DE 10 2012 000 798 A1 is firstly the effort required for manufacture. On the other hand, with that solution long self-supporting lengths for example for the upper run can be achieved at best with additional auxiliary means.

Another dust-tight line guide device is already known from international patent application WO 2005/071284 A1 and U.S. Pat. No. 7,784,259 B2. This involves a monolithic tube-like casing produced by an extrusion process. In that case one side is more flexible in the peripheral direction than the other side. Thus, the one side can be bent in the peripheral direction over the other side to close the casing. That structure also allows only relatively short self-supporting lengths.

An approach which goes further in this respect is known from German laid-open application DE 10 2012 100 290 A1 and US patent application US 2012 2005 498 A1. That discloses a jointed protective and guide device for cables and the like, which is also intended to prevent fine dust produced by abrasion from being set free. For that purpose, there is also provided a flexible tube-like sheath element, but with a plurality of tubular individual receiving passages in order to guide the lines separately from each other. Provided at both sides of the tubular sheath is a respective support chain which is hingedly composed of link members and which limits the curvature radius of the direction-changing curve and on the other hand prevents bending sag in the self-supporting upper run. Like the line guide device in DE 20 2013 101 203 U1 that solution links the advantages of conventional energy guide chains in respect of mechanical loading and self-supporting lengths with a protection, which is also suitable for critical applications, to prevent the escape of abrasive particles. The solution in accordance with DE 10 2012 100 290 A1 is however more complicated and expensive to manufacture as special production involving special plastic link members is used for the support chains. A further disadvantage of the solution in accordance with DE 10 2012 100 290 A1 is that repair of an individual line or a support chain is possible only after the line guide device has been completely dismantled. The band or sheath element which is extruded in one part in accordance with DE 10 2012 100 290 A1 cannot be opened in portion-wise fashion.

The line guide device referred to in the opening part of this specification, as disclosed in DE 20 2013 101 203 U1 accordingly forms the basic starting point for the present inventions.

SUMMARY

A) First Group of Inventions:

A first object of the invention is accordingly that of proposing a line guide device which affords good protection from the unwanted issue of abrasion-induced particles and which can be produced with less effort in comparison with the state of the art.

In a line guide device of the general kind set forth, in accordance with claim 1, that object is already attained in that the sheath is in the form of a corrugated tube and has a corrugated profile which at least promotes flexibility and that the dust-tight sheath has an asymmetric bending behaviour in relation to the desired curvature about the direction-changing axis and in relation to the basically undesired opposite curvature. The asymmetry is such that the permitted bending sag of a self-supporting region is considerably less in comparison with the desired curvature, that is to say the curvature in the direction-changing curve. That asymmetry can be inherent in the sheath or can be achieved or enhanced by additional means, in particular attachment parts.

The desired curvature about the direction-changing axis or curvature inwardly is referred herein for simplification purposes as a "concave" curvature while the unwanted opposite curvature or curvature outwardly is referred to as the "convex" curvature.

An asymmetric bending behaviour can be achieved in particular by virtue of the sheath having a lower degree of in particular axial compressibility radially outwardly or at the outside of its periphery—with respect to the direction-changing axis—than radially inwardly or at the inside of its periphery, that is to say the outside can be compressed to a lesser degree in particular in the longitudinal direction of the sheath.

The corrugated tube-like configuration of the sheath can basically be of any kind insofar as it ensures the required flexibility. Typically, the sheath for that purpose has corrugation peaks and troughs or inwardly and outwardly extending portions, that is to say a corrugated profile, as considered in longitudinal section. A large number of different profiles are possible in that respect, for example a curved profile, for example an approximately sine wave-shaped profile, an angular profile, for example a rectangular profile, a hybrid shape with rounded edges and so forth. The cross-section of the sheath is also not crucial, thus circular, slot-shaped or approximately rectangular cross-sections and so forth can be considered.

What is decisive for the following aspects of the invention in contrast is that the bending behaviour has an asymmetric bending characteristic, in particular a flexibility which is of differing magnitude depending on the respective bending direction, at least in the plane in which the upper run, the lower run and the direction-changing curve extend, that is to say the plane in which the direction-changing curve is displaceable. In other words, in the portion being considered, the flexibility with a bending moment of equal magnitude is dependent in predetermined fashion on the direction of rotation of the bending moment.

That provides that the sheath itself, that is to say even without using a conventional energy guide chain or special support chain, ensures an adequate support function in the self-supporting region. In addition, this provides that the sheath itself can guide and carry the lines. Accordingly, it is possible to completely dispense with a support chain or typical energy guide chain. In other words, in comparison with DE 20 2013 101 203 U1 a line guide device according to the invention provides that the sheath which is provided initially for affording sealing integrity in relation to dust at the same time takes over substantial functions of conventional energy guide chains. The sheath considered in itself can be adapted to limit the radius of curvature in the direction-changing curve on the one hand, but also in regard to avoiding excessive bending sag in the upper run and/or in the lower run. In other words, the sheath itself, optionally with attachment parts for both cases, can ensure a different minimum radius for the curvature or bending.

Accordingly, the sheath considered in itself is preferably not only self-supporting but is also in the form of a carrier for the lines. Accordingly, lines can be guided directly in the sheath without an additional device for receiving the lines. All details in respect of function and configuration relating to the sheath and in particular details in respect of shape and dimensions relate in the present case, insofar as something different is not evidently intended, to the rest condition or the load-free condition of the sheath. In the present case, unless otherwise stated, the bending sag relates to the bending in the straight condition with a nominal line loading, but without other load or without overload. Dust-tight in the present context does not necessarily mean hermetically gas-tight or closed in such a way that nothing can enter or escape. Rather dust-tight means technically sealed in relation to the escape of abrasive particles of typical grain sizes, which in conventional energy guide chains are produced by the chain link members or the lines rubbing against each other.

The application of the invention however is not limited to clean room applications. Joint connections with frictional rubbing can be avoided by virtue of the inherent flexibility. By virtue of the asymmetric flexibility and the lesser degree of bending sag that this entails the sheath is suitable at least for short self-supporting lengths.

Asymmetric bending behaviour in accordance with the invention occurs at least over a length portion of the line guide device. The flexibility can possibly also be differently asymmetric and/or symmetrical in portion-wise fashion. In particular a flexibility which varies over the length is also in accordance with the invention. Similarly, a configuration which is substantially in one plane is respectively implemented in the individual portions, wherein planes can also differ in portion-wise manner and for example can be disposed perpendicularly to each other. In a preferred configuration the corrugated tube-like sheath even when completely filled with lines—in comparison with the desired concave curvature—allows only a very slight or substantially no convex curvature, that is to say only very slight or substantially no bending sag. It is thus possible to ensure an optimum, approximately straight configuration for the upper run. For that purpose, in the unloaded condition the sheath can involve a slight concave pre-curvature or pre-stressing.

An asymmetric, direction-dependent bending behaviour can be achieved for example by the sheath being made from at least two different materials, in particular plastics involving different flexibility. A suitable distribution of material over the cross-section can already ensure the desired characteristic.

The following two aspects are respectively based on the above-discussed concept of the invention which is common to the first group.

A) 1) First Aspect ("e-Skin"):

In accordance with a first aspect, in a particularly simple embodiment, the asymmetric bending behaviour is achieved at least predominantly or exclusively in that the corrugated tube-like sheath at the outside of its periphery has a different corrugated profile than at the inside of its periphery. The desired curvature characteristic of the sheath in itself can be predefined or predetermined by a differing profile configuration at the two sides. Accordingly, no additional components like for example support or guide chains are required for that purpose. The various profiles at the two sides of the sheath, besides the direction-dependent flexibility, can also predetermine a pivotal plane or curvature plane for the sheath. In addition, the profile configuration, in particular at the outside, can be so selected that one of the two corrugated profiles enjoys higher shear and compression strength than the other profile. The various profiles can be made from the same material or from differing material.

In a preferred configuration with different profiles which inter alia permits only slight or no compression in the longitudinal direction at the outside the corrugated tube-like sheath at the outside has a profile with corrugation troughs, the internal axial width of which is less than 20%, in particular less than 10%, of the axial width of the corrugation peaks. In that way there is only very little free space for compression at the outside. Compression of the corrugation peaks themselves can in turn be reduced or prevented by the configuration thereof.

In an advantageous embodiment the corrugated profile of the outside or radially outwardly is of an omega shape in longitudinal section. In that case corrugation peaks have flanks which are bulged out towards the ends. The profile is of such a configuration that in the straight position of the sheath, in particular in the self-supporting upper run, those flanks bear against each other at both sides.

In a preferred configuration with differing profile at the inside and outside the corrugated tube-like sheath at its inside has a corrugation profile with corrugation troughs, the internal axial width of which is at least 50% of the axial width of the corrugation peaks and in particular is approximately of the same size. Thus, in particular a per se known tried-and-tested profile can be provided at the inside.

Various profiles at the two sides of the sheath can be implemented in particular in plastic, by suitable methods in plastic technology, even in the case of sheaths which are produced portion-wise or which are in one piece over the entire length. One-piece sheaths are dust-tight on their own.

Production of the corrugated tube-like sheath, which is simple and variable more easily in the curvature radius is made possible if it is composed portion-wise as a modular structure, for example being composed from two shell portions with differing profiles. Thus, for example shell portions at the inside with various predetermined curvature radii can be combined with a shell portion at the outside, which prevents bending sag. The intersection at which the two shell portions are joined is in that case preferably at the level of the neutral fibre of the line guide device where dust-tight connection between the parts is simplified by virtue of minimum relative movement.

Separately produced shell portions can also be produced from differing material without particular complication and effort.

A structure for the sheath with portions comprising two shell portions also makes it possible for at least one shell portion and preferably the outward shell portion to have one or more separating legs formed thereon, which divide the internal space in its cross-section. Abrasion due to friction between the lines is minimised or avoided by virtue of the division into a respective passage region for each line.

The line guide device according to the first aspect is particularly light, it runs with a low level of noise and vibration, it involves a low level of maintenance and it can be produced relatively inexpensively. Accordingly, it can be used in a large number of applications.

The first aspect finally also concerns the shell portion for the production of a line guide device in accordance with one of the above embodiments. For that purpose, the shell portion can be made in one piece from flexible plastic material and in longitudinal section can have a corrugated profile with an asymmetric bending behaviour in relation to a curvature about a direction-changing axis and an opposite bending effect. In accordance with the invention the corrugated profile is so selected that the permitted bending is considerably less, in comparison with the desired curvature. That can be achieved in particular by a corrugated profile of an omega shape, with corrugation peaks which have bulged-out flanks towards the ends, and wherein the corrugation profile is of such a configuration that those flanks are in contact with each other at both sides in the straight position, that is to say in a self-supporting region.

A) 2) Second Aspect ("e-Rib"):

According to a second aspect alternatively or supplemental to the first aspect for determining the curvature characteristic or for achieving or enhancing asymmetric flexibility a separate supporting rib structure (referred to in English as the "supporting skeleton") which is fitted from the outside with transverse ribs extending in the peripheral direction can be provided. With this approach the sheath can be in particular in the form of a conventional corrugated tube with a bending characteristic which in itself is symmetrical or independent of direction. Together with the supporting skeleton as an attachment portion the corrugated tube with conventional profiling then forms the sheath according to the invention.

In a first embodiment of the second aspect the sheath has a separate supporting skeleton which is fitted from the outside and which has transverse ribs which extend in the peripheral direction and which at an outside include projections projecting in the longitudinal direction as abutments to prevent bending sag. In that case the projections are of such a configuration that, by virtue of the projections, in a straight or self-supporting position of the sheath, the transverse ribs are in contact with each other. Preferably two projections which are shaped in mutually conjugate relationship are respectively provided in particular on each transverse rib at both sides. The projections of adjacent transverse ribs can cooperate in that case, in particular in centring relationship, to increase the length and also the lateral stability of the self-supporting part, in particular the upper run. That structure has the advantage that it is compatible with a conventional corrugated tube of various diameters within a nominal range. A development can provide that the supporting skeleton has at both sides flexible holding arms projecting in the peripheral direction. They make it possible for the supporting skeleton to be held at the outside to the sheath, similarly as when using clips or open clamping shells.

In a second embodiment of the second aspect, that is to say with a supporting skeleton in the form of a separate component fitted to the sheath, the transverse ribs can engage from the outside or at the outward side into the corrugated profile of the corrugated tube-like sheath. In that way the transverse ribs which for example engage over half the periphery, together with the corrugation peaks, jointly form a means for stiffening the arrangement to resist bending sag as the corrugation troughs are occupied.

In an alternative third embodiment of the second aspect the supporting skeleton for achieving asymmetric flexibility can also be disposed in the internal space, that is to say with transverse ribs which engage from the inside or at the inward side into the corrugated profile. The arrangement at the interior is more complicated and expensive but it inherently avoids even theoretically possible abrasion between the supporting skeleton and the sheath.

The transverse ribs of the separate supporting skeleton in the second and third embodiments of the second aspect make it possible in particular in a simple fashion to reduce the internal axial width or the free space between corrugation peaks and/or corrugation troughs at the outside, with respect to the direction-changing curve, in comparison with the corresponding free space between corrugation peaks and/or corrugation troughs at the inward side. In addition, the curvature plane and/or the curvature radius can also be predetermined by the configuration of the supporting skeleton.

Preferably the supporting skeleton in the second or third embodiment is of such a configuration that a corresponding transverse rib engages into at least every third corrugation of the corrugated profile, preferably into every corrugation of the corrugated profile. The axial compressibility of the outside is considerably reduced in that way.

For determining the curvature characteristic, it is advantageous in relation to all embodiments if the supporting skeleton has two mutually opposite carriers which extend in the longitudinal direction and which carry the transverse ribs, wherein the carriers are preferably disposed at the level of the neutral fibre of the line guide device or predetermine that fibre, for example in the case of a conventional corrugated tube as the sheath. The supporting skeleton is preferably produced in one piece, in particular in the form of a plastic injection moulding. Corresponding carriers can be fixed at both ends to the connecting locations in order to carry tensile and compressive force upon displacement of the direction-changing curve and thus to relieve the load on the actual sheath. It is accordingly advantageous if the supporting skeleton is of a longitudinal extent which at least corresponds to the maximum length of the upper run, preferably the overall length of the line guide device. Lateral stability in relation to bending out of the curvature plane can be achieved by the supporting skeleton, in particular the carriers.

For adaptation of the receiving capacity, it is advantageous if the carriers have lateral fixing means for connection to the supporting skeleton of a further sheath. In that way a plurality of sheaths can be fixed in parallel relationship to each other to form a line guide device with a larger receiving space therein.

In addition, end fixing means can be provided on the carriers for fixing in the longitudinal direction of successive supporting skeletons and possibly for the transmission of tensile and shear forces.

As protection from kinking or buckling, in particular for a conventional corrugated tube, it is advantageous if the supporting skeleton has at both sides approximately wedge-shaped or V-shaped relatively short extensions, tabs or tongues for example as a prolongation of the transverse ribs transversely relative to the carriers, which engage over a small peripheral extent into the corrugated profile of the inside in order to predetermine a minimum radius of curvature for the direction-changing curve by virtue of the included angle of the wedge shape or V-shape.

For carrying the invention into effect, it is advantageous if a lesser degree of compressibility, in particular in the axial or longitudinal direction, is implemented in the cross-section over a portion of the outer peripheral region, which is at least 12.5%, preferably between 25% and 50%, of the full peripheral extent of the sheath. Accordingly, a suitable profile or supporting skeleton should effectively reduce the compressibility at the outside over a certain angular or peripheral extent of the cross-section.

Particularly when using a supporting skeleton, it is advantageous for determining the curvature characteristic if the corrugated profile of the sheath is corrugated in parallel annular shape, that is to say it is not corrugated in a helical or spiral configuration. Desirably the sheath and possibly also the supporting skeleton are made from a flexible plastic, in particular an elastic plastic which has long-term flexural strength, preferably a thermoplastic material.

The invention makes it possible in particular to limit the static convex bending sag to a radius which is greater by a multiple, in particular by at least 10 times, than the static bending radius of the corrugated tube-like sheath in the case of concave curvature. In that respect the term static bending radius is used to denote the minimum radius in the rest condition (without displacement movement) at which the limit of plastic deformation is reached.

A module for the modular construction of a supporting skeleton or a supporting skeleton module is also claimed as relevant to the invention for the second aspect. It serves together with a sheath including a corrugated tube with corrugated profile for the production of a line guide device for lines, in particular according to the first and second embodiments of the second aspect. According to the invention a supporting skeleton module is produced in one piece from flexible plastic, it has a longitudinal extent, and is of such a configuration that it can be fitted from the outside to a corrugated tube. It also has a plurality of transverse ribs extending in a peripheral direction, that is to say transversely relative to the longitudinal extent. Depending on the respective embodiment it has transverse ribs which can at least partially engage into the corrugated profile of the corrugated tube or transverse ribs which include projections projecting in the longitudinal direction in such a way that in a straight or self-supporting position the transverse ribs are in contact with each other, in the sense of the corresponding description hereinbefore. The module can also have all or some of the above-mentioned further features of the supporting skeleton, in particular carriers, lateral and/or end fixing means for expansion or modular prolongation, holding arms and so forth.

The use of a supporting skeleton according to the second aspect is advantageous in particular for small radii in the direction-changing region as it is here that a particularly soft-elastic material is desirable for the sheath. The latter resists slight bending sag in the self-supporting region. Depending on the respective application involved a supporting skeleton can also be combined with a profile configuration according to the first aspect.

A) 3) Third Aspect ("e-Skin Zipper"):

A further aspect relating to the first group of inventions concerns the strength and sealing action in relation to dust particles of the connection for assembly of the individual shell portions, in which respect it is possible to achieve in particular an improvement over the teaching of DE 20 2014 104 458 U1.

For that purpose, there is proposed a corrugated tube-like shell portion for a line guide device, which is formed by a corrugated tube-like sheath which is respectively composed portion-wise from two shell portions, in particular two shell portions of differing profiles.

In principle the shell portions can be connected at the junction in the longitudinal direction in various ways, for example after manufacture, non-detachably by an adhesive or welding process, in particular a connecting process which is suitable for plastics like for example ultrasonic welding. A destruction-free releasable but nonetheless sufficiently firm connection is however preferred, in particular to permit subsequent opening of the sheath.

According to the third aspect of the invention it is therefore proposed that the shell portion has at both longitudinal sides a fixing band which extends in the longitudinal direction and which in particular is continuous and which has a tooth arrangement, preferably with regularly arranged sprigs or teeth which cooperate with a corresponding tooth arrangement on an oppositely disposed shell portion in the fashion of a zip fastener. This ensures a good connection between the mutually opposite shell portions, that is firmly closed in operation.

As is already the case in the first aspect, good lateral stability can be achieved inter alia by the fixing bands but also an elongate cross-section and a transversely stiff configuration of the shell portions.

The teeth of the connectors acting similarly to a zip fastener can in particular have an effective cross-section which at least approximately corresponds to the shape of an isosceles trapezium. The effective cross-section can be for example that of an isosceles trapezium with rounded configurations in the corner regions. In that respect it can be provided that a narrow side of a trapezoidal tooth faces away from the shell portion to be connected and the converging limbs of the trapezoidal teeth of two respectively connected parts wedge together.

The wedge-shaped or trapezoidal configuration allows in particular fixing or opening of the oppositely disposed shell portions approximately perpendicularly to the longitudinal direction. The teeth can form in particular projections extending the band laterally outwardly, in particular in a direction perpendicular to the longitudinal direction of the shell portion or the line guide device. The teeth can each also project slightly in the direction towards the other shell portion, from the fixing band.

In a further independent aspect of the invention it is proposed that a shell portion has a longitudinal groove cooperating with a corresponding tongue on the other shell portion to be connected, in positively locking relationship. Accordingly, the other shell portion, preferably in the region between the tooth arrangement and the transition to the corrugated tube-like sheath, has a tongue cooperating in positively locking relationship with a corresponding longitudinal groove on the shell portion to be connected. In that way it is possible to further improve the sealing integrity and also the fixing of the shell portions to each other.

It can be provided that disposed at an end region is a sealing projection which is directed perpendicularly to the longitudinal axis and which is peripherally continuous while disposed at the other end region is an inwardly disposed, correspondingly extending sealing groove into which the sealing projection of the adjacent portion in the longitudinal direction can engage in positively locking and/or force-locking relationship. It is also possible in that way to achieve a sealing and fixed connection at the ends. That can also be provided in relation to shell portions in accordance with the first and possibly the second aspects.

In that respect the sealing projection can have an initially converging cross-section which is thickened at the end and which is preferably similar to a mushroom head or a game playing piece.

In regard to all sheaths comprising shell portions it is advantageous if the join between the fixing bands forms the neutral fibre of the line guide device. By virtue of the fact that the layer which upon curvature involves a constant dimension in the longitudinal direction (=neutral fibre) is precisely at the intersection, inter alia a firm connection of the shell portions to each other is made possible as they are prevented from gaping open upon bending.

All the afore-mentioned aspects are respectively viewed on their own and independently as inventive and accordingly can also be claimed independently of each other in divisional applications.

B) Second Group of Inventions ("T-Carrier"):

A further independent object of the invention, taking German Utility Model DE 20 2013 101 203 U1 as the basic starting point, is to propose a line guide device which reduces possible abrasion between sheath and a guide device arranged in the interior. That further object is attained independently of the foregoing description by a line guide device according to claim 33. Advantageous developments in that respect are recited in appendant claims 34 to 40.

The second concept which considered in itself is deemed to be inventive concerns a line guide device for lines like for example cables, hoses or the like, in particular for a clean room application, wherein the line guide device has a first end for fixing to a stationary connecting location and a second end for fixing to a connecting location which is relatively moveable. Between the ends it forms an upper run, a displaceable direction-changing curve and a lower run, the direction-changing curve being curved about a direction-changing axis, preferably with a predetermined curvature radius. The line guide device has a flexible sheath which dust-tightly surrounds an internal space, in particular both in the longitudinal direction between the two ends and also in the peripheral direction.

The second invention which is independent of the above-mentioned first group is characterised in that the sheath is carried by a line guide comprising interconnecting link members which are flexible or pivotable relative to each other about the direction-changing axis, wherein each link member has two respective mutually opposite side portions and at at least one side portion, projecting laterally outwardly, at least towards one side, a fixing projection is provided for fixing the sheath to the respective link member.

That measure already provides that a relative movement and thus abrasion between the sheath and the line guide arranged in the interior is very substantially excluded. At the same time the production of noise is minimised and construction which is correct as intended, in particular after maintenance operations, is ensured in a simple fashion.

In a preferred embodiment the side portions of each link member have first abutments for limiting the curvature radius in relation to concave curvature about the direction-changing axis and second abutments for limiting the opposite convex bending sag. Accordingly, a sheath of a simple construction can be used, without its own carrier and guide function.

For predetermining the bending characteristic and avoiding abrasion it is advantageous if there are provided fixing projections at both sides, that is to say at the oppositely disposed side portions of a link member. Preferably the fixing projections are formed on the side portions at the level of the neutral fibre. Thus, for example even easily produced half-shells of corrugated tube-like material or other flexible sheathing shells can be reliably fixed to the line guide.

It is advantageously provided that the fixing projections at the side portions form a band which is continuous in the longitudinal direction and the sheath is composed portion-wise and as a modular structure from two shell portions.

Thus, the shell portions can be fixed to the fixing projections at the inside and the outside, each in dust-tight relationship, in a simple fashion.

In a preferred embodiment the side portions, with the exception of the fixing projections, are designed in accordance with the teaching of EP 2 142 823 B1. In that case each side portion has a connecting leg which extends in the longitudinal direction and which is bendable about the direction-changing axis, as well as a plurality of T-shaped legs which are substantially perpendicular to the connecting leg, each having a leg base and a longitudinal leg. First T-shaped legs, at ends of their longitudinal legs, that face in the longitudinal direction, form the first abutments for limiting the curvature radius and oppositely disposed second T-shaped legs, at ends of their longitudinal legs, facing in the longitudinal direction, form the second abutments for limiting the bending sag.

As a departure from the above-mentioned teaching the second concept of the invention advantageously provides that each fixing projection is formed by a flat lateral prolongation of the corresponding connecting leg and for example is produced in one piece with the side portion.

In addition, a preferred development provides that each link member is produced in one piece with two side portions, wherein each side portion includes a fixing projection as well as first and second T-shaped legs. In that arrangement the link member is adapted to be flexible about the direction-changing axis so that chain linking of such members forms a kind of band chain.

It is also in accordance with the second concept of the invention for a line guide in the manner of a typical link chain, for example in accordance with the teaching of WO 02/086349 A1 or EP 0 803 032 B1, to be developed with fixing projections according to the invention for the sheath.

The sheath can be in particular in the form of a corrugated tube-like structure. In principle other tube-like sheaths can also be used, for example comprising in particular flexurally elastic plastic, with the line guide device according to the second concept of the invention.

Finally, both the embodiments of the first and also the second groups of inventions can advantageously be developed in respect of sealing integrity to resist the discharge of fine dust in such a way that provided at the first and the second end of the device is a respective connecting flange for dust-tight closure of the ends of the sheath, that are open there. A development which is preferred in that respect provides that each connecting flange includes two clamping shells which can be dust-tightly connected and which at a front end region hold the sheath in force-locking and/or positively locking relationship and dust-tightly enclose same. Preferably the connecting flange has fixing means for fixing purposes, in particular for making the screw connection to the respective connecting location. Particularly preferably both clamping shells of each connecting flange have such fixing means so that they can be secured to each other at the same time with the fixing to the connecting location.

In a preferred embodiment each connecting flange, in an end region, preferably in opposite relationship to the front end region, has a suitable pass-through sealing means for passing the lines therethrough in dust sealing relationship.

BRIEF DESCRIPTION OF THE DRAWINGS

Further details, advantages and features of the invention will be apparent from the description hereinafter of preferred embodiments by way of example with reference to the accompanying drawings in which:

FIGS. 3A-3D show a portion of a second embodiment of a line guide device as a perspective view (FIG. 3A), as an enlarged portion (FIG. 3B) and in longitudinal section parallel to the curvature or movement plane of the direction-changing curve (FIG. 3C), and in cross-section perpendicularly to the longitudinal direction (FIG. 3D);

FIG. 6A-6C show a further fourth embodiment in which, in comparison with the third embodiment of FIGS. 4A-4C, a supporting skeleton is provided not externally but internally on the sheath;

DETAILED DESCRIPTION

Figure 1:
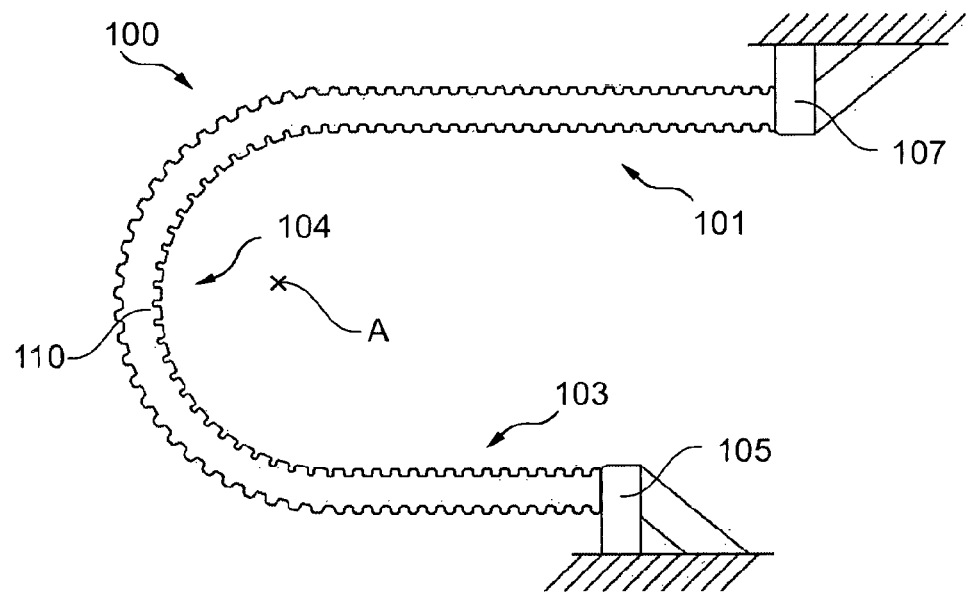
FIG. 1 shows a side view illustrating the principle of a line guide device according to the invention.

In FIG. 1 a diagrammatically shown line guide device is generally denoted by 100. The line guide device 100 serves for protectedly guiding cables, hoses or the like lines which are not shown in greater detail in the views. Between an upper run 101 and a lower run 103 the line guide device 100 in known manner forms a direction-changing curve 104 of predetermined curvature. To avoid line breakages, the direction-changing curve 104 has in particular a predetermined minimum curvature radius and thus ensures that the curvature radius does not fall below the permissible curvature radii of the lines being guided.

The direction-changing curve 104 is displaceable over a distance relative to the stationary connection 105 together with the moveable connection 107. The movement takes place substantially in a plane which here is approximately vertical and follows the movement of the moveable connection 107. In the illustrated example the stationary connection 105 is at the upper run 101 and the moveable connection 107 is at the lower run 103. The two ends of the line guide device 100 can also be connected in the reverse fashion.

FIG. 1 also diagrammatically shows as an essential aspect of the invention a flexible sheath 110 which surrounds the lines guided in the interior in the peripheral direction and between the two connections 105, 107 in continuously closed and technically dust-tight relationship. As can be seen from FIG. 1 the sheath 110 is of a tube-like configuration and is sufficiently flexible, for example by means of a suitable design configuration and/or choice of material, to accommodate the fixedly predetermined curvature of the direction-changing curve 104 and to follow the displacement movement of the direction-changing curve 104 with the minimum possible resistance.

Figure 2A:
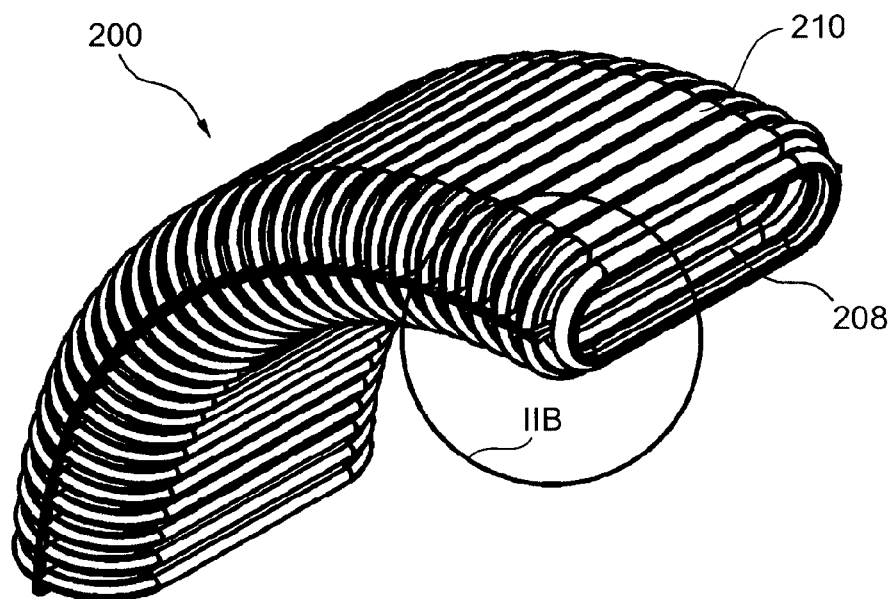
FIGS. 2A-2C show a portion of a first embodiment of a line guide device as a perspective view (FIG. 2A), as an enlarged portion (FIG. 2B) and in longitudinal section parallel to the curvature or movement plane of the direction-changing curve (FIG. 2C)
Figure 2B:
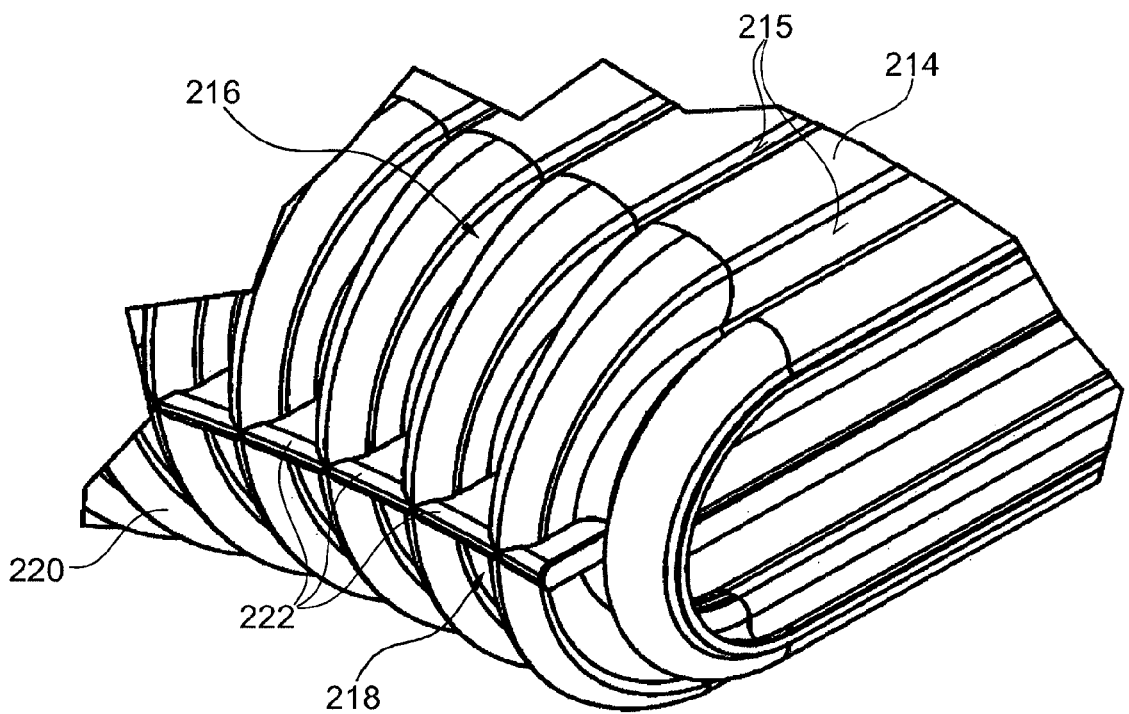
Figure 2C:
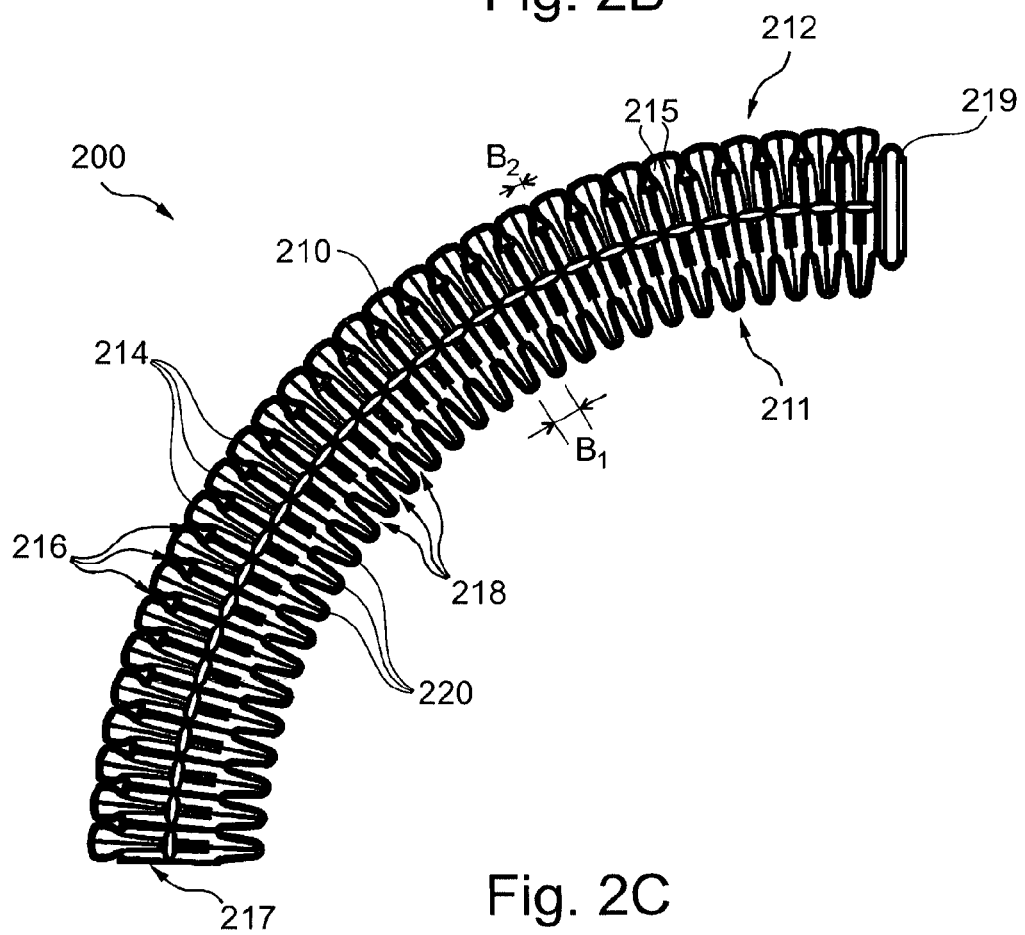

FIGS. 2A-2B show a first embodiment of a line guide device 200 according to the invention with a sheath 210. The sheath surrounds an internal space 208 in dust-tight relationship so that abrasive particles cannot escape. The sheath 210 has an asymmetric bending behaviour in relation to concave and convex curvature about the direction-changing axis (indicated diagrammatically at A in FIG. 1). For that purpose the sheath 210 at its inside 211 (that is to say radially inwardly of the broad side) and its outside 212 (that is to say radially outwardly of the bright side) has corrugated tube-like profiles which however are respectively of different kinds. As shown in FIG. 2C the profile at the outside 212 has corrugation peaks 214, the shape of which in longitudinal section (FIG. 2C) is approximately Ω-shaped (omega-shaped) so that flanks 215, which are bulged out at the ends, of the corrugation peaks 214 are in contact with each other in the straight position of the sheath 210 at both sides of the corrugation peaks 214 respectively. It is thus possible in a simple fashion to provide that the sheath 210 permits only slight or substantially no convex bending sag in the other direction, in comparison with the desired concave curvature about the direction-changing axis A (see FIG. 1). The sheath 210 itself can ensure an approximately straight configuration for the upper run, even when the latter is loaded with the weight of the guided lines (not shown). To enhance the carrier force of the profile at the outside 212 it is further provided that, at the outside 212, the corrugation troughs 216 between the corrugation peaks 214 are of a very small free or internal axial width B2, here for example less than 20% of the axial width of the corrugation peaks 214 at the outside 212. The internal axial width B2 of the corrugation troughs 216 at the outside 212 is also markedly less than the corresponding internal axial width B1 of the corrugation troughs 218 at the inside 211.

As FIG. 2C shows the corrugated tube-like sheath 210, viewed in longitudinal section through the central region, at the inside 211 in contrast to the outside 212, can involve a conventional profile, for example a rounded corrugated profile, with corrugation troughs 218 and corrugation peaks 220 whose largest dimension in the longitudinal direction or axial width is respectively approximately the same.

In the embodiment shown in FIGS. 2A-2C the line guide device 200 is composed portion-wise of pieces of the sheath 210 as shown in FIG. 2A. In this example each piece is produced in one piece, in particular from plastic, in the longitudinal direction and in the peripheral direction. For connecting two pieces of the sheath 210 they respectively have at an end a completely peripherally extending latching ring 219. The latching ring 219 can be latched in positively locking relationship into the opposite end 217 in the manner of a tongue-and-groove connection. In this arrangement each latching groove, in comparison with the correspondingly conjugate fitment at the opposite end 217, can involve a slight excess dimension so that it is possible to achieve a dust-tight press fit.

As FIG. 2B best shows, flange-like longitudinal struts 222 are provided at the level of the neutral fibre of the line guide device 200 at the transition between the inside 211 and the outside 212. The longitudinal struts 222 are integrally joined to the material which forms two adjacent corrugation peaks 214 at the outside of the sheath 210. Thus, together with the flanks of the corrugation peaks 214, that act as abutments, this arrangement provides a stable structure which permits even long self-supporting lengths with the line guide device 200 completely filled, without troublesome bending sag. To enhance that effect the pieces produced in one piece, as shown for example in FIG. 2A, can already be concavely pre-curved in the load-free position, that is to say they are produced with an inherent prestressing in relation to the straight position. The longitudinal struts 222 also increase the shear and compression strength, that is to say the mechanical load-bearing capacity of the sheath 210, so that it is possible to produce a line guide device 200 of great overall length.

FIGS. 3A-3C show a second embodiment of a line guide device 300 which also has a sheath 310 with an asymmetric bending characteristic in relation to curvature concavely and convexly about the direction-changing axis A. For that purposes, similarly to FIGS. 2A-2C, provided at the outside 312 is a different profile from that at the inside 311. Corresponding or identical features in comparison with FIGS. 2A-2C are accordingly provided with correspondingly increased references and the description thereof is not repeated.

A substantial difference in the second embodiment as shown in FIGS. 3A-3D is that the pieces for portion-wise assembly of the sheath 310, unlike FIGS. 2A-2C, are respectively composed of two separately produced shell portions 331, 332, wherein a shell portion 331 with a profile forms the inside 311 of the sheath 310 and the other shell portion 332 with a different kind of profile forms the outside 312.

As the enlarged view in FIG. 3B shows the intersection 335 for connecting the shell portions 331, 332 together is at the level of the neutral fibre of the line guide device 300. As shown by way of example in FIG. 3B the connection can be made by means of any positively locking and/or force-locking connection. In the example of FIGS. 3A-3B both shell portions 331, 332 at the intersection 335 respectively have press knobs 333 arranged alternately in the corrugation troughs 316 and 318 respectively, and receiving means 334 of a correspondingly conjugate shape. Other fixing means suitable for making a dust-tight connection between the shell portions 331, 332 are also in accordance with the invention. If the connection made is not a connection involving intimate joining of the materials involved, the second embodiment shown in FIGS. 3A-3D facilitates maintenance in comparison with the first example in FIGS. 2A-2C as individual longitudinal portions of the line guide device 300 are more easily accessible.

As FIGS. 3A-3C show the shell portions 331, 332 are preferably fixed to each other with a slight longitudinal displacement relative to each other, similarly to a brickwork course. Thus, the fixing means provided for connecting two oppositely disposed shells 331, 332 together, for example press knobs 333 and corresponding recesses 334, are used at the same time for strengthening the longitudinal connection of the portions of the sheath 310 in the longitudinal direction. Accordingly, a connection between the shell portions 331, 332, that is shear-resistant in the pulling direction, is preferred at the intersection 335. For sealing integrity to prevent the escape of abrasion-produced fine dust each shell portion 331, 332 preferably has at an end a kind of sealing lip 339 which sealingly engages into the end corrugation peak 314 at the respectively opposite end 317.

FIG. 3D shows a further difference in the second embodiment in comparison with FIGS. 2A-2C. The two-part production of the longitudinal portions of the sheath 310 provides that separating legs extending in the plane of movement can be arranged on one of the two shell portions 331, 332, for example at the shell portion 332 forming the outside 312, to divide the internal space 308. The various lines can be guided separately from each other by the separating legs 340, whereby abrasion between those lines is very substantially avoided.

Figure 4A:
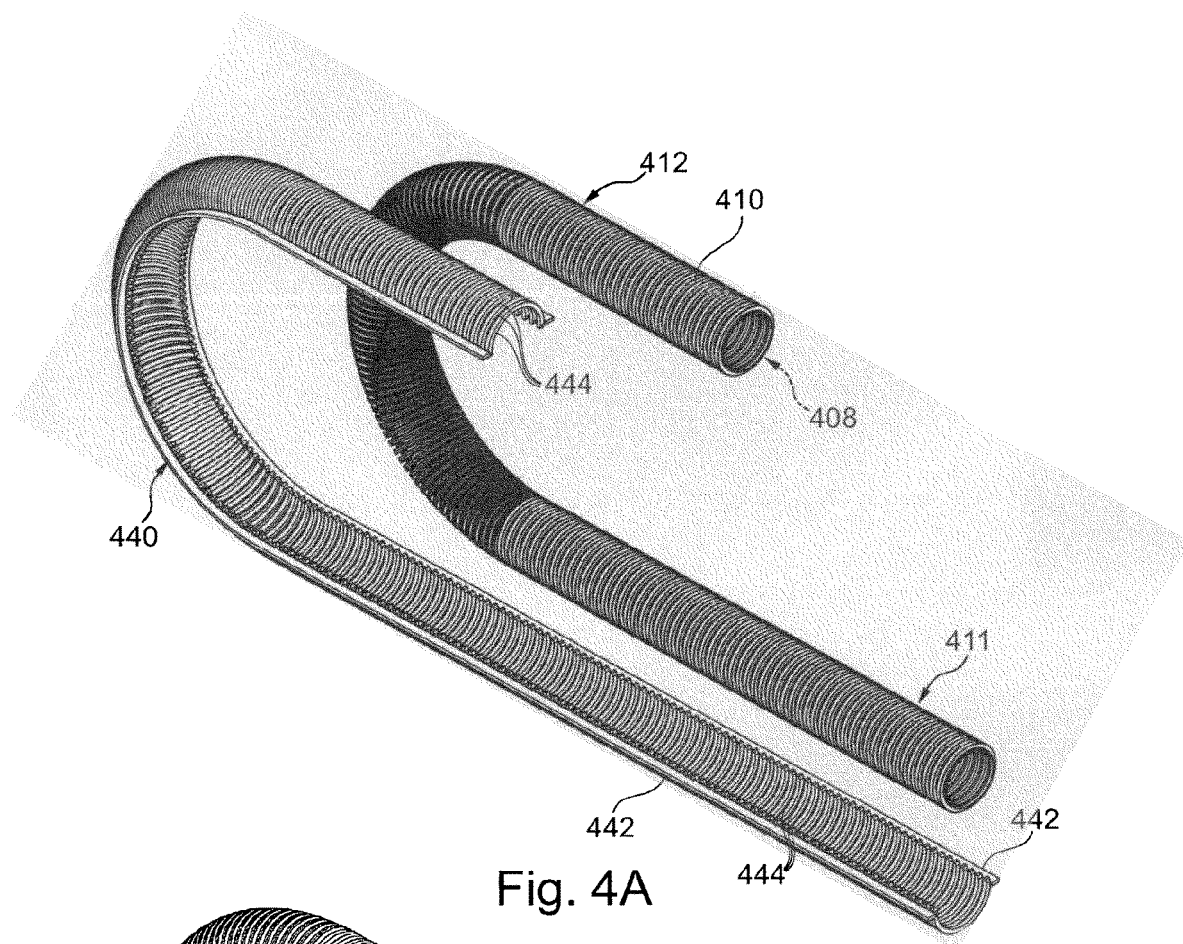
FIG. 4A-4C shows a portion of a third embodiment of a line guide device according to the invention as a perspective exploded view (FIG. 4A), as a perspective assembled view (FIG. 4B) and as an enlarged side view (FIG. 4C)
Figure 4B:
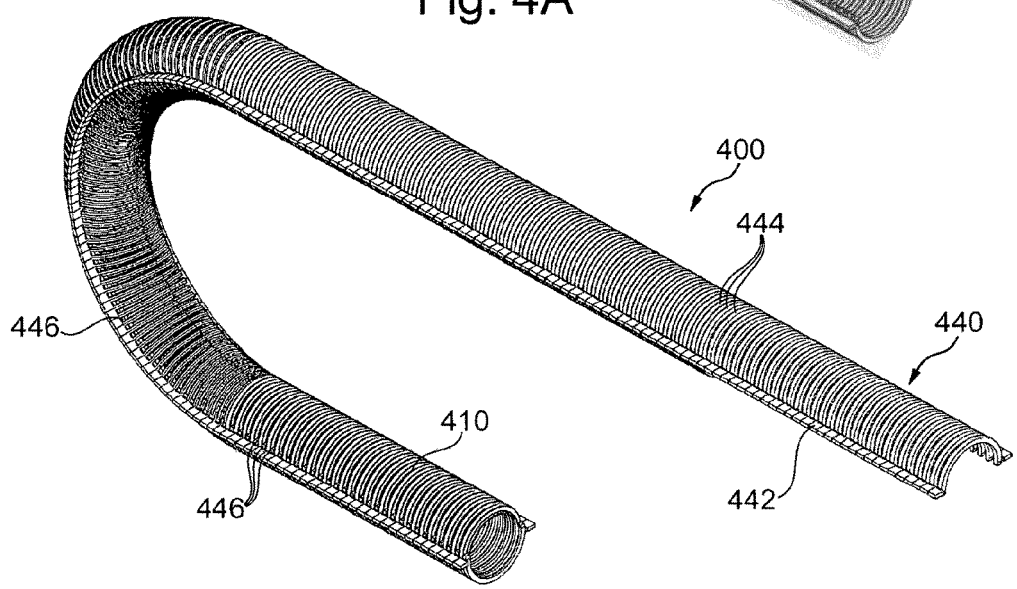
Figure 4C:
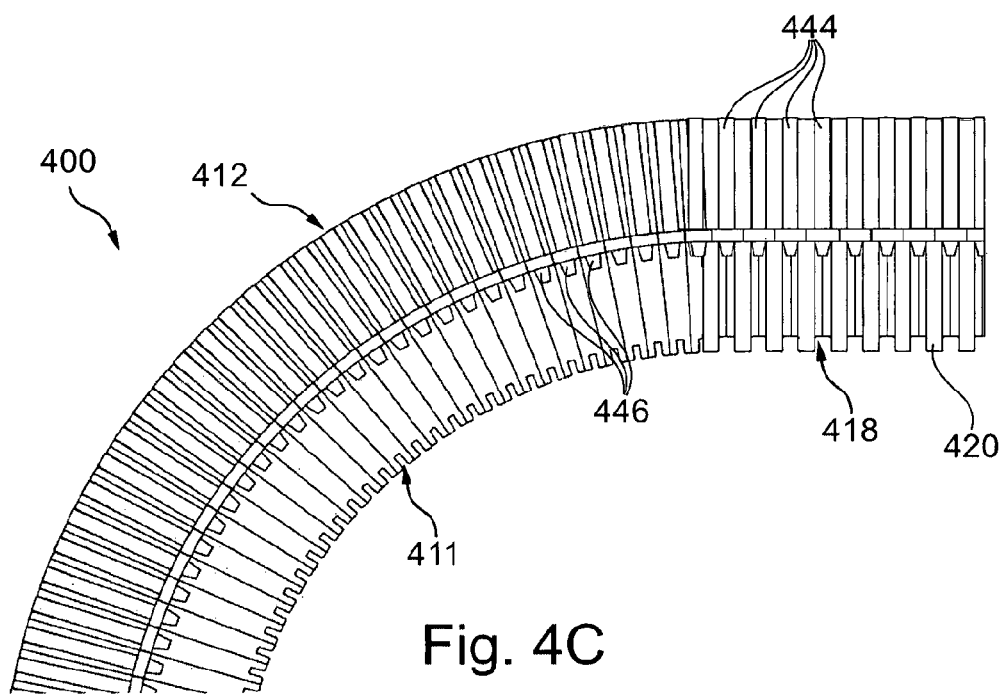

FIGS. 4A-4C show an alternative third embodiment of a line guide device 400. Apart from connecting flanges for dust-tightly fixing the ends (as shown by way of example in FIGS. 8A-8B), this line guide device comprises only two essential components, namely a sheath 410 and an especially produced supporting skeleton 440. The sheath 410 which is shown individually in FIG. 4A can be in the form of a conventional corrugated tube. Accordingly, the corrugated tube 410 in itself can have a symmetrical bending characteristic in every direction, that is to say even in relation to concave or convex curvature about the direction-changing axis of the direction-changing curve 104 (FIG. 1). To ensure an asymmetric bending characteristic with a considerably reduced convex flexibility in comparison with the concave curvature about the direction-changing axis A in the embodiment of FIGS. 4A-4C the separately produced supporting skeleton 440 is fitted from the outside, in relation to the direction-changing curve 104, at the outside 412 of the corrugated tube 410.

The supporting skeleton 440 is asymmetric in respect of its bending characteristic. It can be easily bent concavely about the direction-changing axis A but only limitedly convexly bent in the opposite direction. As can best be seen from FIG. 4C the supporting skeleton 440 has two oppositely disposed carriers 442 which extend in the longitudinal direction and on which are provided transverse ribs 444 extending substantially perpendicularly, in the peripheral direction. The carriers 442 and transverse ribs 444 can be produced in one piece from plastic material, for example by an injection moulding process.

The shaping and configuration of the transverse ribs are adapted to the outside contour of the cross-section of the sheath 410. In the case of a corrugated tube 410 of approximately round cross-section the transverse ribs 444 are approximately in the shape of a circular arc as in FIGS. 4A-4B and involve an arc extent of about 180° (see also FIG. 5). The peripherally extending transverse ribs 444 of the supporting skeleton 440 are fixed in mutually parallel relationship at regular predetermined spacings to the carriers 442 respectively. As FIG. 4C best shows the transverse ribs 444 serve primarily to substantially fill or close the otherwise free corrugation troughs 420 at the outside 412 of the corrugated tube 410. In that way the flexibility or bendability in a direction opposite to the concave curvature about the direction-changing axis A is considerably reduced at the outside 412 by the corrugation troughs 420, or that is completely prevented, depending on the respective corrugated profile of the corrugated tube 410. The supporting skeleton 440 is therefore preferably of such a design configuration that the regular spacing between the transverse ribs 444 corresponds to the corrugation length, that is to say the periodic spacing between two successive corrugation troughs 420 of the corrugated tube 410. This therefore provides that precisely one transverse rib 444 engages into each corrugation of the corrugated profile.

In addition to functioning as a reinforcement for the corrugated tube 410 the supporting skeleton 440 also has the effect of defining the neutral fibre at the level of the oppositely disposed carriers 442 and at the same time also establishing the plane of movement of the direction-changing curve 104 (FIG. 1). Connecting means at the ends of the supporting skeleton 440 are not shown in greater detail, for respectively connecting the carriers 442 fixedly to the connecting locations (see FIG. 8). By virtue of the carriers 442 the supporting skeleton 440 can additionally carry tensile and compressive forces and increase the service life and load-carrying capability of the corrugated tube 410. Accordingly the supporting skeleton 440 preferably involves a longitudinal extent corresponding to the total length of the line guide device 400 from the one connecting location to the other connecting location 105, 107 (FIG. 1).

Finally FIG. 4C shows tab-like or tongue-like extensions 446 provided at both sides as a tangential prolongation of the transverse ribs 444. The extensions 446 are approximately wedge-shaped or V-shaped in side view. The extensions 446 are of a very short extent in the peripheral direction, in comparison with the periphery of the corrugated tube 410, and form a predetermined spread angle between the end limbs which face in the longitudinal direction. As FIGS. 4B-4C show the extensions 446 engage over a short peripheral extent at the outside into the corrugation troughs 420 of the corrugated tube 410. By virtue of a predetermined angular extent for the angle between the oppositely disposed limbs of the extensions 446, the minimum curvature radius of the direction-changing curve 104 of the line guide device 400 comprising the corrugated tube 410 and the supporting skeleton 440 is predetermined.

Figure 5:
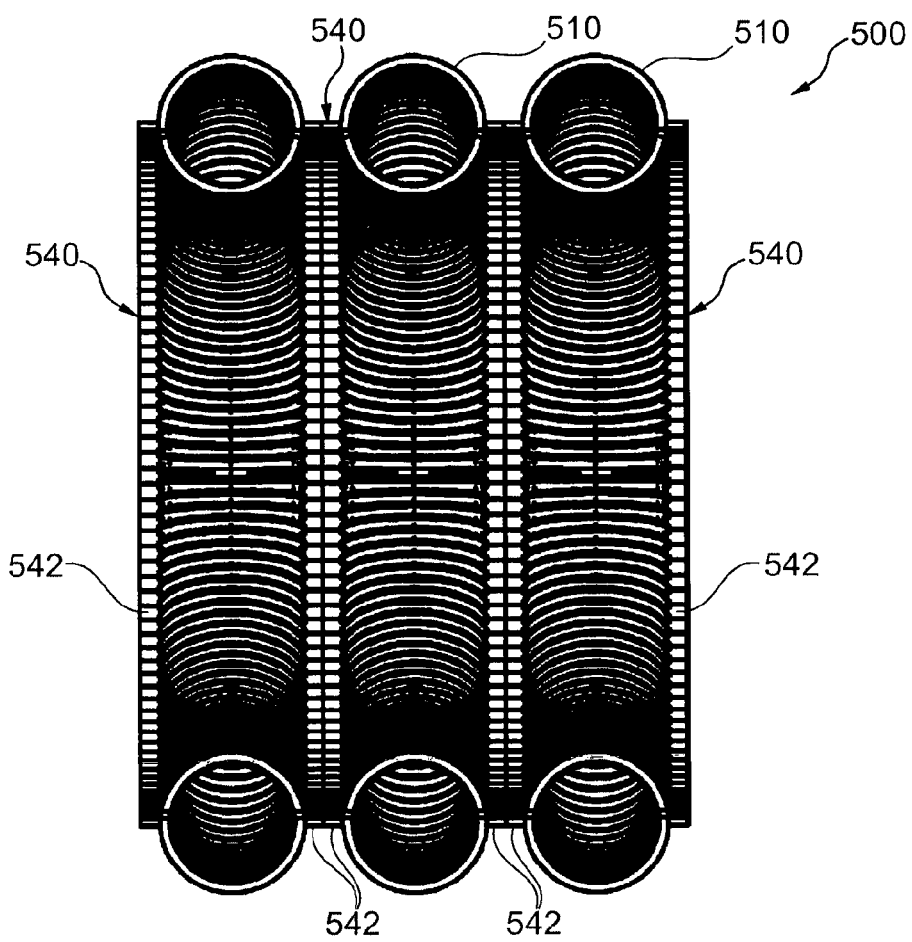
FIG. 5 shows a variant of the third embodiment of FIGS. 4A-4C with a plurality of sheaths in a vertical cross-section showing the inside of the direction-changing curve.

FIG. 5 shows a development of the embodiment of FIGS. 4A-4C. In this embodiment, apart from the end connecting flanges, the line guide device 500 substantially comprises three corrugated tubes 510 which are arranged laterally one beside the other and parallel and which are held parallel by supporting skeletons 540. For that purpose three supporting skeletons 540, identical in structure to FIGS. 4A-4C, are respectively fixed together laterally with their carriers 542. The supporting skeletons 540 are preferably produced as separate individual parts and have connecting means on the carriers 542 which are suitable for connection to the adjacent supporting skeleton 540. In principle a plurality of supporting skeletons 540 can also be made in interconnected relationship from one piece.

FIGS. 6A-6C show as a further embodiment of a line guide device 600 a modification of the example shown in FIGS. 4A-4C. The line guide device 600 can also substantially comprise a conventional corrugated tube as the sheath 610, here of approximately rectangular cross-section, and a separate supporting skeleton 640 for achieving an asymmetric bending characteristic. Unlike the example shown in FIGS. 4A-4C the supporting skeleton 640 of the line guide device 600 is not arranged from the outside on the corrugated tube 610 but at the inside in the sheath 610 in the form of the corrugated tube. As a further difference of substance the supporting skeleton 640 has both transverse ribs 644 facing towards the outside 612 and also transverse ribs 645 facing towards the inside 611. The outer transverse ribs 644 engage from the inside into the hollow space in the corrugation peaks 620 at the outside of the sheath 610. The inwardly disposed transverse ribs 645 correspondingly engage from the inside into the hollow space in the corrugation peaks 620 at the inside of the sheath 610. The corrugated tube-like sheath 610 in itself can have at both sides an identical conventional corrugated profile with corrugation troughs 610 and corrugation peaks 620 which are identical in shape at both sides. Unlike the arrangement shown in the Figures the sheath 610 can be made continuously between both ends. The supporting skeleton 640 can be produced in one piece throughout or can be assembled from individual portions which are successively introduced into the sheath 610. Alternatively to a conventional corrugated tube with per se symmetrical bending characteristic it is also conceivable, similarly to FIGS. 2A-2C and FIGS. 3A-3D, for the sheath 610 to be composed portion-wise from one-part or two-part modules. In the last-mentioned case the corrugated profile at the inside 611 is different from that at the outside 612.

The asymmetric bending characteristic is crucially achieved with the supporting skeleton 640 by virtue of the transverse ribs 644 at the outside 612 being of a greater axial width than the transverse ribs 645 at the inside 611. In that way, as is already the case with the preceding embodiments, the arrangement ensures that the sheath 610 enjoys a lower level of compressibility axially or in the longitudinal direction at its outside 612, than at its inside 611. By virtue of the differently shaped transverse ribs 644 and 645 at the inside and outside 611 and 612 respectively, the supporting skeleton 640 permits on the one hand reinforcement of the sheath 610 to resist bending sag in the self-supporting upper or lower run 101 and 103 respectively, and at the same time a limitation in terms of a predetermined curvature radius in the direction-changing curve 104. For that purpose the inwardly disposed transverse ribs 644 are of a shorter axial width than the outwardly disposed transverse ribs 645.

As is already the case in the example of FIGS. 4A-4C, a defined neutral fibre for the bending configuration of the sheath 610 is also predetermined by oppositely disposed carriers 642 to which the peripherally extending transverse ribs 644, 645 are fixed. The carriers 642 can also be used to carry shear and tensile forces when suitably fixed together or to the connecting locations respectively.

In all preceding embodiments the lines which are not shown in greater detail are received directly in the internal space 208; 308; 408 . . . and are guided and carried by the sheath. For that reason, a particular additional line guide is not required in the examples of FIGS. 2-6.

Figure 7A:
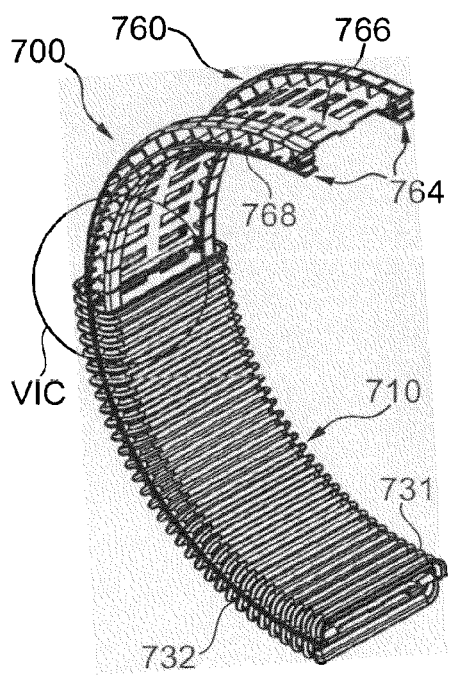
FIGS. 7A-7C show an embodiment of a line guide device according to an independent invention as a perspective, partly broken-away view of the direction-changing curve (FIG. 7A), a corresponding side view (FIG. 7B) and as an enlarged cut-away portion (FIG. 7C)
Figure 7B:
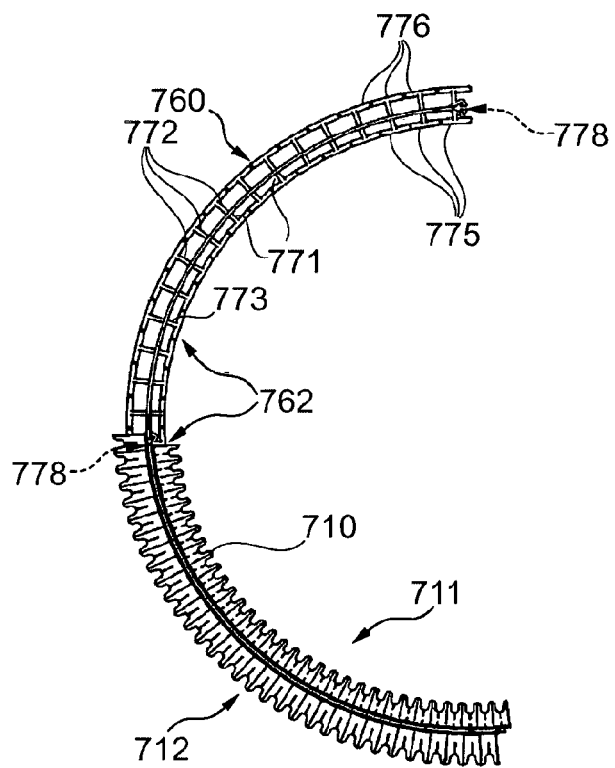
Figure 7C:
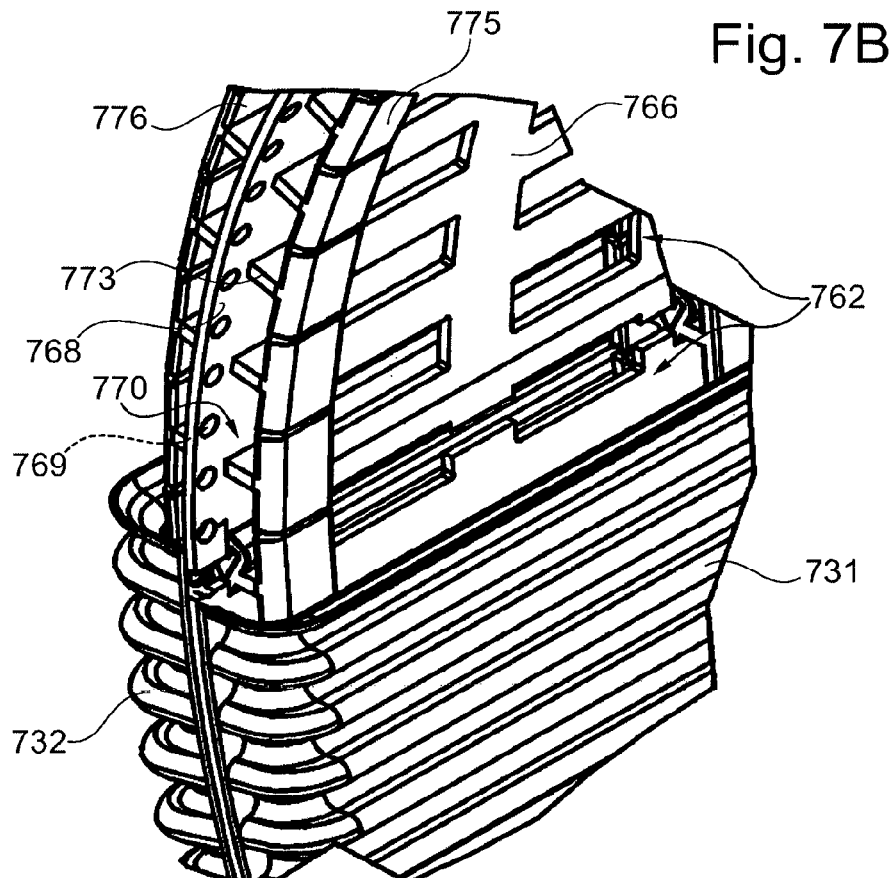

FIGS. 7A-7C show a line guide device 700 in accordance with a principle which is independent and different from the preceding embodiments.

The line guide device 700 in FIGS. 7A-7C substantially comprises a band-like line guide 760, individual portions 762 fixed together in the longitudinal direction and a dust-tight one-piece or multi-piece sheath 710. Each portion 762 as a member of the line guide 760 has a left-hand and a right-hand side portion 764 which are integrally connected together by a continuous carrier band 766 or alternatively are laterally fixed thereto as separate parts. The carrier band 766 is flexible about the direction-changing axis and is made from a flexible tensile-resistant plastic. To improve flexibility about the direction-changing axis the carrier band 766 is provided with a pattern of holes, the elongate holes of which extend transversely relative to the longitudinal direction. The dust-tight sheath 710 is composed in modular fashion from longitudinal sections each having two shell portions 731 and 732 respectively.

As can best be seen from FIG. 7C the portions 762 of the line guide 760 each have fixing projections 768 projecting outwardly laterally from the side portions 764. The fixing projections 768 have fixing means 769 which occur in succession at regular spacings.

The fixing projections 768 serve for fixing an inner and an outer shell portion 731 and 732 respectively of a sheath 710. FIG. 7B shows as the fixing means 769 for example eyes for fixing by means of a latching connection, like by means of a press knob fixing or the like. Other positively locking and/or force-locking fixing means 769 are in accordance with the invention, for example a tongue-and-groove connection or other suitable plastic fasteners for example as in U.S. Pat. No. 2,613,421 A.

The fixing projections 768 preferably form one-piece flat prolongations of the carrier band 766. The fixing projections 768 and the carrier band 766 are arranged at the level of the neutral fibre of the line guide device 700 or predetermine same. At the same time the plane of movement of the direction-changing curve 104 (see FIG. 1) is predetermined in that way. Thus, the intersection between the shell portions 731 and 732 is also at the level of the neutral fibre.

Each side portion 764 has a connecting leg 770 which extends in the longitudinal direction and which is flexible about the direction-changing axis and which is possibly made in one piece with the carrier band 766 and serves for the transmission of compressive and tensile forces. A further connecting leg can be provided centrally in the carrier band 766 for transverse stabilisation purposes, as FIG. 7C best shows.

Substantially T-shaped legs 771 and 772 are respectively formed at each side portion 764 at the inside 711 and the outside 712 respectively perpendicularly to the carrier band 766 or connecting leg 770. The T-shaped legs 771, 772 each have a leg base 773 and a longitudinal leg 775 and 776 extending in the longitudinal direction. At the ends of the longitudinal legs 775, extending in the longitudinal direction, the inwardly disposed T-shaped legs 771 form first abutments for limiting the curvature radius in the direction-changing curve 104. The oppositely disposed second T-shaped legs 772 on the other hand, at the ends of their longitudinal legs 776, facing in the longitudinal direction, form second abutments for limiting the convex bending sag in the opposite direction. The structure, arrangement and function of the T-shaped legs 773, 776 correspond to the preferred embodiment of the T-shaped legs in EP 2 142 823 B1, to the content of which reference is made in its entirety for the avoidance of unnecessary repetition in this respect.

The line guide 760 differs from the band chain-like line guide device in accordance with EP 2 142 823 B1 in particular by the fixing projections 768 for fixing the sheath 710. A further distinction lies in the one-piece production of the portions 762, that is to say the side portions 764 and the carrier band 766 are made in one piece. Otherwise the structure and mode of functioning can correspond to the preferred embodiment of EP 2 142 823 B1, in particular in regard to the positively locking connectors 778 at the ends at the side portions for chain linking of the portions 762 in the longitudinal direction.

The sheath 710 in the embodiment of FIGS. 7A-7C can in principle be of any desired configuration if it is dust-tightly closed. The sheath 710 considered in itself can have an asymmetric bending characteristic in respect of concave and convex curvature about the direction-changing axis A (see FIG. 1) or however can in that respect involve a symmetrical bending characteristic. Limitation on the curvature radius in the direction-changing curve 104 is ensured in the line guide device 700 by the inwardly disposed T-shaped legs 771 of the line guide 760. Long self-supporting lengths on the other hand are ensured by the outwardly disposed T-shaped legs 772. The shell portions 731, 732 of the sheath 710 can be fixed to the line guide 760 in any desired per se known manner suitable for making the dust-tight connection, with releasable connections being preferred.

FIGS. 7A-7C show a sheath 710 which is composed portion-wise from two shell portions 731, 732 and are secured to fixing projections 768 at both sides. In an alternative configuration (not shown here) a one-piece sheath which can be pivoted or bent open at the periphery can be fixed only at one side to one of the side portions 764. For that purpose, it is thus sufficient if fixing projections 768 are provided only at one side.

Figure 8A:
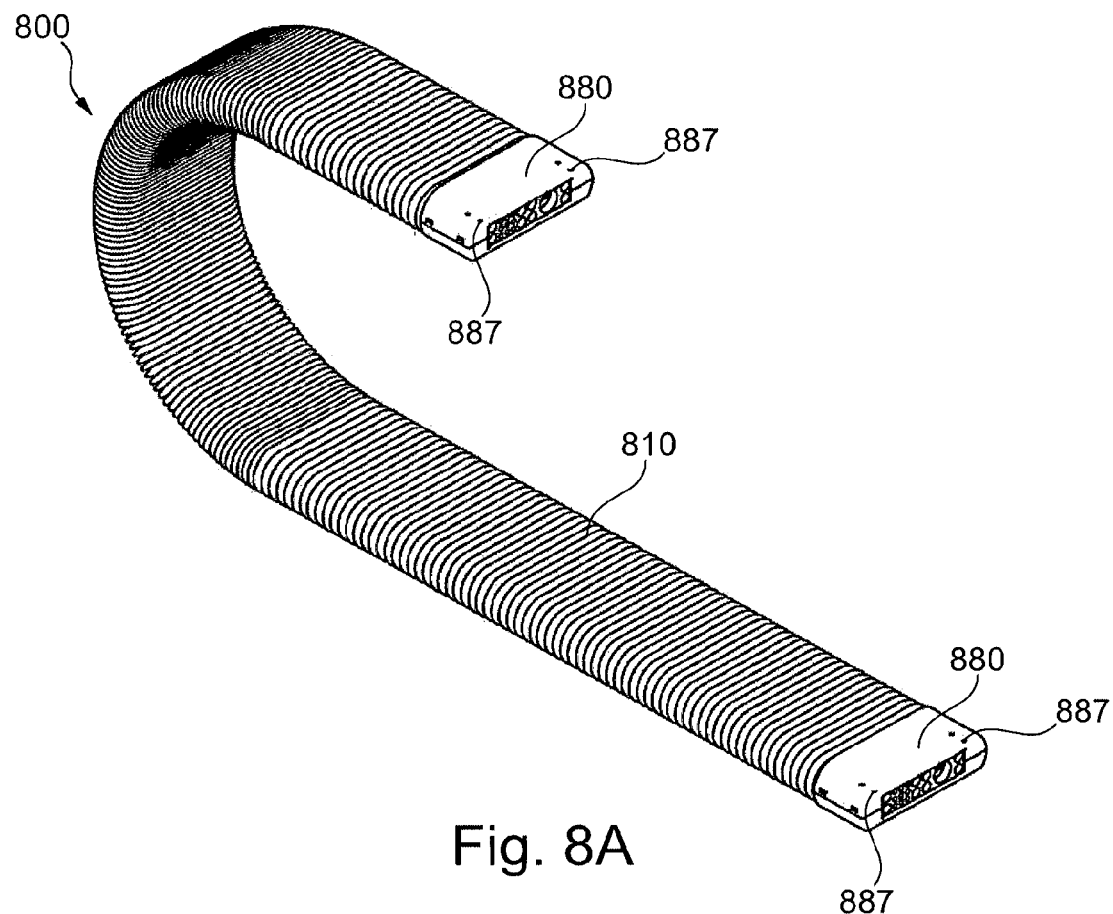
FIGS. 8A-8B show a preferred embodiment of connecting flanges for fixing the ends of a line guide device to the stationary and moveable connecting locations respectively.
Figure 8B:
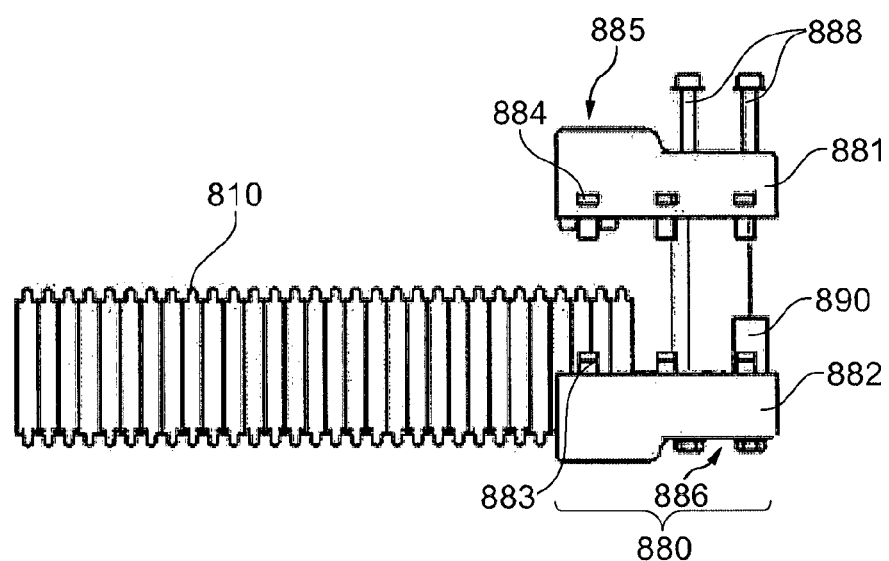

FIGS. 8A-8B show a preferred configuration of suitable connecting flanges 880 for end fixing of one of the above-described line guide devices at the connecting locations 105, 107 (see FIG. 1). In the example shown in FIGS. 8A-8B the sheath 810 is shown in the form of a corrugated tube or corrugated hose with parallel corrugation and slot-shaped or elongate cross-section, like for example in FIGS. 2A-2C, FIGS. 3A-3D or FIGS. 7A-7C.

FIG. 8B shows an exploded view illustrating only a part of the sheath 810 or the line guide device 800, namely one of the two similarly designed end regions which are respectively fixed to an identically designed connecting flange 880. The connecting flanges 880 serve at the same time for dust-tightly closing off the open ends of the sheath 810 and fixing same to the connecting locations 105, 107.

For sealing and fixing purposes each connecting flange 880 is composed of two cooperating clamping shells 881, 882 which are in the form of cover-like injection mouldings which can be dust-tightly connected. The clamping shells 881, 882 are latchable together by snap-action hooks 883 and recesses 884, in which respect other positively locking and/or force-locking connections, in particular releasable latching connections, are also possible. At a front end region 885, the closed clamping shells 881, 882 hold the sheath 810 fixedly in the longitudinal direction in force-locking and/or positively locking relationship, in particular positively locking relationship, by engagement into one or more corrugation troughs, and peripherally dust-tightly seal off the sheath 810, possibly by means of an additional seal (not shown).

As FIGS. 8A-8B show, two pairs of passage openings 887 are provided for connecting screws 888 on both clamping shells 881, 882 for fixing purposes. The openings 887 for connecting screws 888 in the rear region 886 at the same time permit fixing of a passage seal 890 for the cables or hoses to be passed therethrough in dust-tight relationship. The seal 890 can be clamped on the lines for example by the connecting screws 888. The sheath 810 can be sealed off and the ends of the line guide 800 can be fixed to the connections 105, 107 (see FIG. 1) by that configuration of the clamping shells 881, 882, in one working step.

The separate seal 890 in each connecting flange 880 is preferably compressible and/or is provided with apertures for the lines. The seal 890 can be for example in the form of a one-piece polyurethane block or in the form of a multi-layer neoprene stack. Provided in the rear end region of the clamping shells 881, 882 is a respective inwardly disposed holder for the seal 890.

Figure 9A:
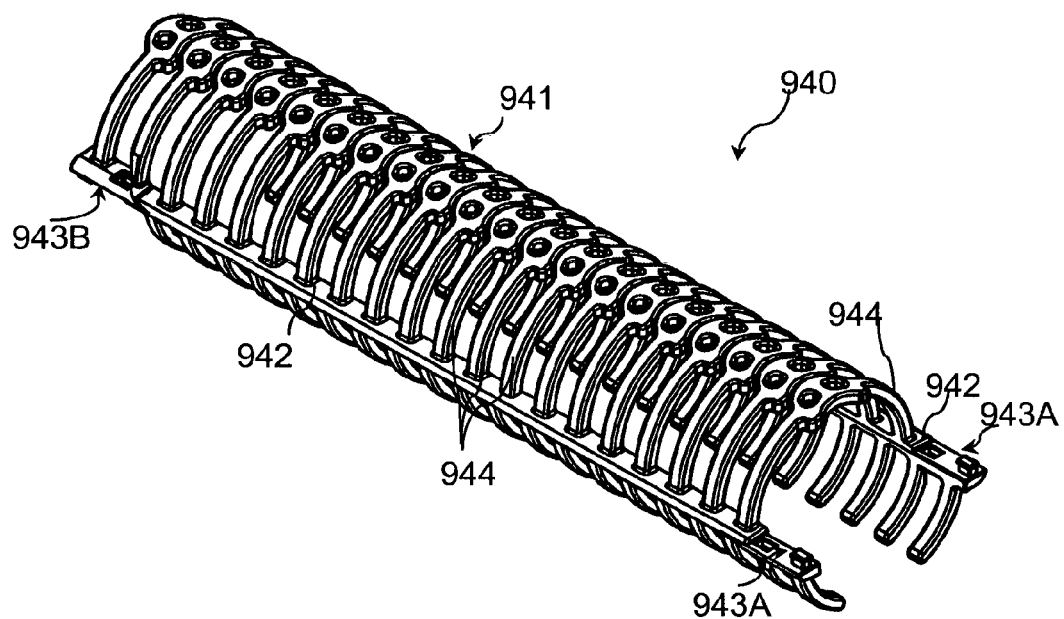
FIGS. 9A-9C show a module portion of an alternative configuration of a supporting skeleton as a perspective view (FIG. 9A), in cross-section (FIG. 9B) and as an enlarged plan view on to projections with an abutment function (FIG. 9C)
Figure 9B:
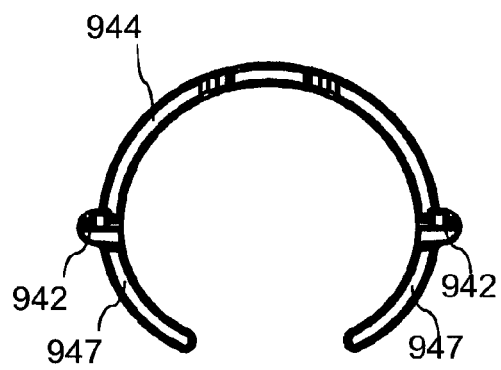
Figure 9C:
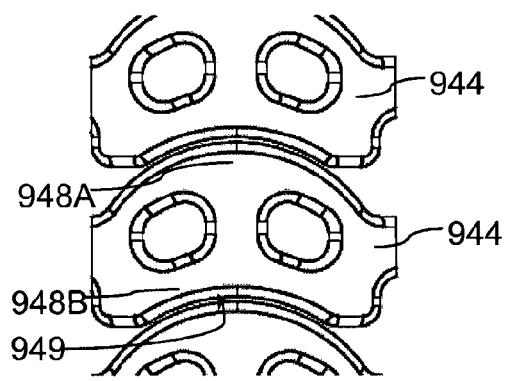

FIGS. 9A-9C show a longitudinal portion of a further embodiment of a supporting skeleton 940, namely an elongate module 941 for portion-wise assembly to further identical modules 941. For that purpose, provided at the end on carrier bars 942 are conjugate clip connectors 943A, 943B having latching clip and receiving means in order to link the modules 941 and carrier bars 942 lengthwise together. The supporting skeleton 940 or module 941 is produced in one piece or integrally from plastic having long-term flexural strength and has inter alia a plurality of transverse ribs 944. The transverse ribs 944 extend in cross-section in the shape of a circular arc over approximately half the periphery between the two carrier bars 942 which are parallel in the longitudinal direction and in that case are arranged parallel to each other at a regular longitudinal spacing. A plurality of holding arms 947 arranged in paired relationship in a mirror-symmetrical arrangement respectively extend in opposite relationship in the cross-section (FIG. 9B) in a regularly parallel condition. The holding arms 947 also extend substantially in the shape of a circular arc in cross-section, in each case only over a portion of the periphery, for example over about an eighth of the periphery. The holding arms 947 can spread open to fit the supporting skeleton 940 radially on to a corrugated tube (not shown here, see 410 in FIG. 4A). The holding arms 947 can merge into the carrier bars 942 centrally between the transverse ribs 944 in the longitudinal direction.

By suitable flexibility about the longitudinal axis and by virtue of the holding arms 947 a supporting skeleton 940 comprising modules 941 can be used better than the supporting skeleton in FIGS. 4A-4C, together with a corrugated tube of any corrugated profile, including helical or spiral profiles, and within tolerance limits, even with different diameters. The holding arms 947 clip to the outside surface of the corrugated tube and do not have to engage into corrugation troughs. In addition, fitment to the corrugated tube is perceptibly facilitated in that way.

To limit the minimum curvature radius in the direction-changing curve or direction-changing region (FIG. 1), the intermediate spacing and the width of the holding arms 947 can be adjusted in the longitudinal direction according to the application involved. Thus, in particular very small radii can be implemented with a particularly flexible corrugated tube.

To provide stiffening against bending sag in opposite relationship to the desired curvature, in particular in respect of the highly flexible corrugated tube, the transverse ribs 944 opposite to the opening between the holding arms 947 have projections 948A, 948B which project in the longitudinal direction or which bulge out axially and which are shaped integrally with the transverse ribs 944. The oppositely disposed projections 948A, 948B are conjugate in shape in plan view, for example with a half-moon or sickle shape in respect of the one projection 948A and with an aperture 949 adapted in radius thereto on the other projection 948B. The projections 948A, 948B act as abutments, with which the transverse ribs 944 bear against each other in the straight position as shown in FIG. 9A. The conjugate shaping of the projections 948A, 948B means that in the abutting condition it is possible to achieve a centring or direction-defining action and also a laterally stabilising action, that is to say to resist breaking out transversely relative to the desired direction of curvature, as can best be seen from FIG. 9C. The effective abutment surface area is increased by virtue of the circular arcuate shape. In addition, engagement between the axial projections 948A, 948B can also provide stiffening to a certain degree in relation to torsion.

In conjunction with a supporting skeleton 940 comprising modules 941 it is also possible, as is already the case in FIGS. 4-5, to use a conventional corrugated tube as the sheath with a predefined curvature characteristic, that is to say as a line guide, between two relatively moveable connecting locations (see FIG. 1).

Figure 10A:
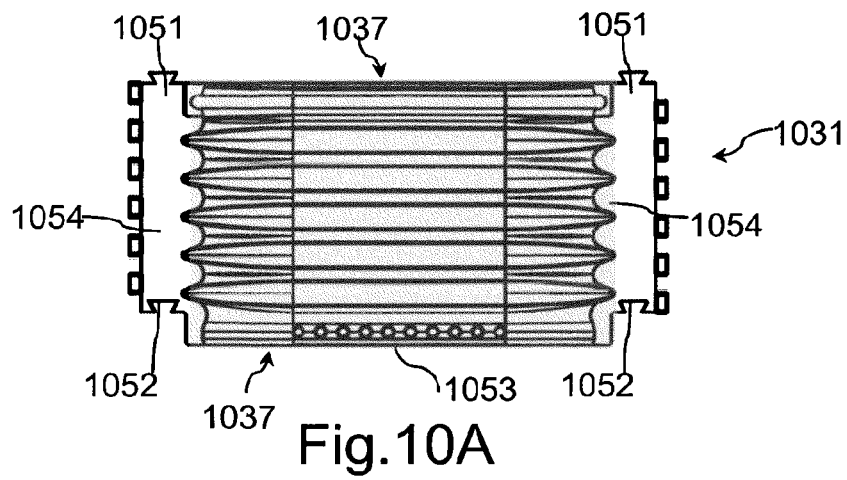
FIGS. 10A-10C show a further embodiment of a shell portion for a sheath as shown in FIGS. 1-3 as a plan view of the inside (FIG. 10A), a partly broken-away perspective view of the sheath (FIG. 10B) and a longitudinal section at the level of the ends (FIG. 10C)
Figure 10B:
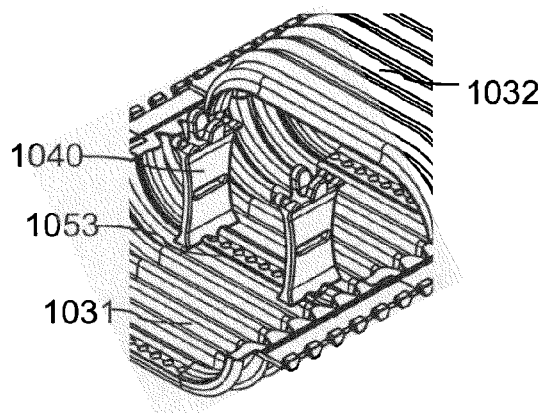
Figure 10C:
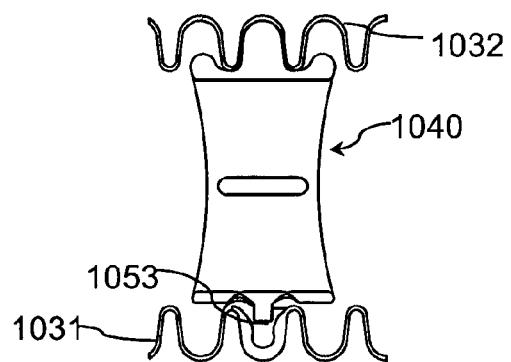

FIGS. 10A-10C show an embodiment of shell portions 1031, 1032, that is an alternative to FIGS. 3A-3D, in which respect only the substantial differences in structure are discussed. At one end 1037 which has the sealing lip for engagement into the oppositely disposed end (not shown) the shell portion 1031 in FIGS. 10A-10C has an inner apertured strip 1053 with blind holes which are arranged regularly perpendicularly to the longitudinal direction. A separate separating leg 1040 with corresponding pins can be selectively fitted into the blind holes in the apertured strip 1053. The separating legs 1040 can be so positioned as to divide the internal space as desired and to guide the lines separately from each other, as can be seen by way of example from FIGS. 10B-10C. The base of the separating leg 1040 with the pin can also engage over the two ends 1037 of adjoining shell portions 1031 (this is not shown here) for axial securing purposes. At the other end the separating legs 1040 can have a projection which engages in fitting relationship in such a way that it cannot fall out into a corrugation trough in the corrugated profile, as shown in FIG. 10C.

At each of the parallel fixing bands 1054 to provide for longitudinal strutting or longitudinal reinforcement, for the purposes of securing to the adjacent shell portion (FIG. 10B), the shell portions 1031, 1032 respectively have at both ends 1037 respectively cooperating connectors 1051, 1052 for the better transmission of forces. The connectors 1051, 1052 can be of a configuration for example like a dovetail join. The fixing mechanism of the fixing band 1054 for the oppositely disposed shell portion 1031 and 1032 respectively has, as shown in FIGS. 10A-10C, teeth for making a connection similarly to a zip fastener, as are described hereinafter in greater detail with reference to FIGS. 12-16. In addition the axial overall length of a shell portion 1031, 1032 as shown in FIGS. 10A-10C is overall shorter than in FIGS. 3A-3D, for example with an extent over less than ten corrugation periods of the corrugated profile. The corrugated profile of both shell portions 1031 and 1032 however can be as shown in FIGS. 3A-3D.

Figure 11:
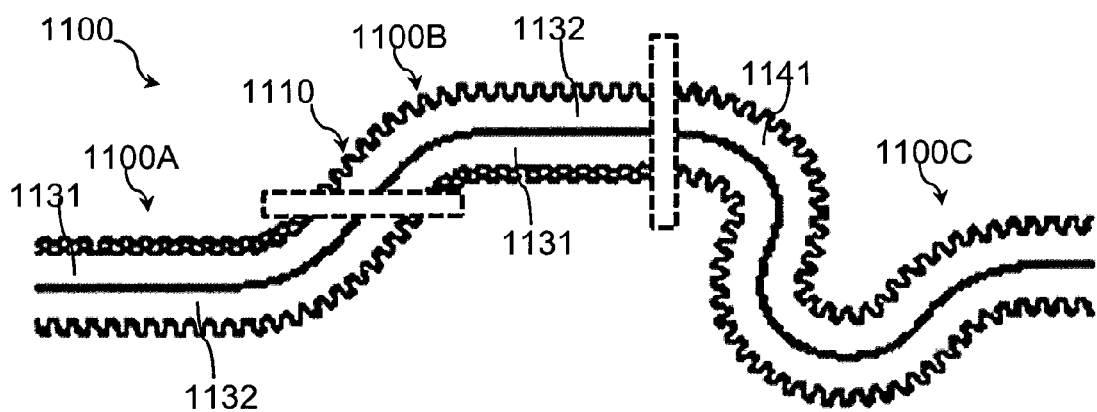
FIG. 11 is a diagrammatic side view showing the principle of a line guide device according to a further independent aspect of the invention.
Figure 12:
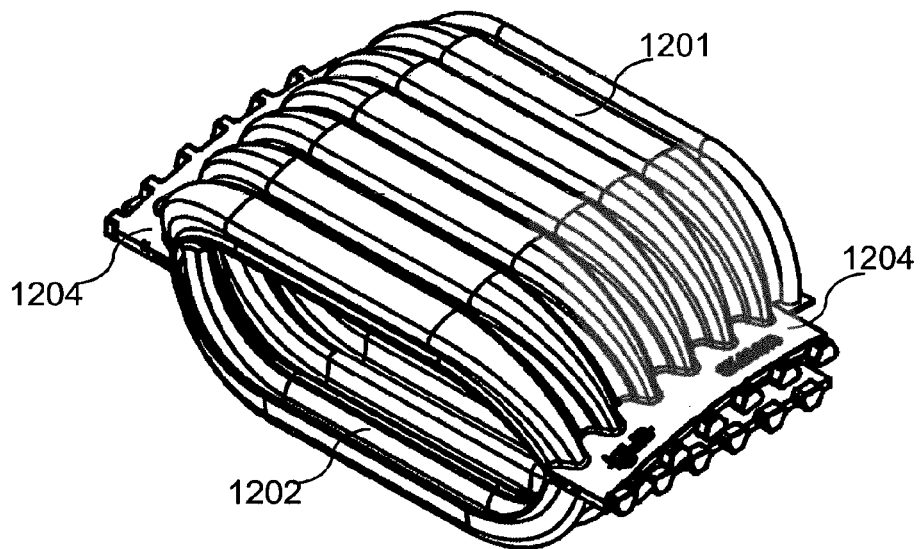
FIG. 12 shows a view of two corrugated tube-like shell portions which in accordance with a further independent aspect of the invention are connected to afford a portion of a line guide device, in particular as shown in FIG. 1.

FIG. 11 shows purely by way of example one of many possible configurations of a line guide device 1100 with a sheath composed of a plurality of longitudinal portions 1100A, 1100B, 1100C in the longitudinal direction. The join locations between the longitudinal portions 1100A, 1100B, 1100C are only diagrammatically shown in FIG. 11 (broken-line boxes). In the first longitudinal portion 1100A the shell portions 1131, 1132, for example in the embodiment as shown in FIGS. 3A-3D or FIGS. 12-16, are so arranged that a desired curvature in accordance with a first direction of rotation about a direction-changing axis (not shown) is possible and the opposite bending sag in that portion 1100A is substantially suppressed. In the second longitudinal portion 1100B the shell portions 1131, 1132 are arranged in reversed relationship or in mirrored relationship with the neutral fibre, that is to say the asymmetric bending characteristic is converse relative to the longitudinal portion 1100A. The third longitudinal portion 1100C has a corrugated tube 1141 with a symmetrical bending characteristic, that is to say with a corrugated profile which is identical at the wide sides. In the example of FIG. 11 the line guide device 1100 is flexible substantially in the plane of the Figure and stable perpendicularly thereto, that is to say laterally, as the sheath is of an elongate-round cross-section (see FIG. 3D or FIG. 14B). It is however also possible to achieve a desired three-dimensional configuration for example by means of suitable transitional sockets between shell portions 1131, 1132 which are turned through 90°, or by an angularly rotated arrangement of supporting skeletons, for example as shown in FIGS. 4A-4C or FIGS. 9A-9C, on a corrugated tube with a round cross-section. In that way it is also possible to pre-define a configuration with angularly displaced curvature axes between individual longitudinal portions.

Further independent aspects of the invention are described hereinafter by means of FIGS. 12-16, with reference to FIG. 1:

In FIG. 1 a diagrammatically shown line guide device is generally indicated by 100. Such a line guide device 100 serves for protectedly guiding cables, hoses or the like lines which are not shown in greater detail in the views. Between an upper run and a lower run the line guide device 100 forms in known manner an approximately U-shaped direction-changing curve of predetermined curvature. The direction-changing curve, to avoid line breakages, has in particular a predetermined minimum curvature radius and thus guarantees that the radius does not fall below the permissible curvature radii of the lines being guided.

In regard to the structure of the line guide device 100 generally and in respect of the particular profiling for the curvature radius of the corrugation peaks and troughs in the main part of the corrugated tube-like shell portions 1201, 1202 we refer to the teaching which is expressly incorporated here in relation to FIG. 1 and FIGS. 2-3 above, in particular the foregoing teaching relating to the corrugated profile of FIG. 2C.

The line guide device 100 forms a dust-tight corrugated tube-like sheath and is composed portion-wise from two respective oppositely disposed, corrugated tube-like shell portions 1201, 1202 of differing profiles, see FIG. 2C. The shell portion 1201 can have a concave prestressing at the outside.

Each shell portion 1201, 1202 has a fixing band 1204 which is continuous in the longitudinal direction, at the two longitudinal sides. The fixing band 1204 has a respective tooth arrangement with regularly arranged sprigs 1205 or teeth which cooperate with a corresponding tooth arrangement with sprigs 1205 or teeth on the fixing band 1204 of the oppositely disposed shell portion 1201, 1202 in the manner of a zip fastener.

Figure 13:
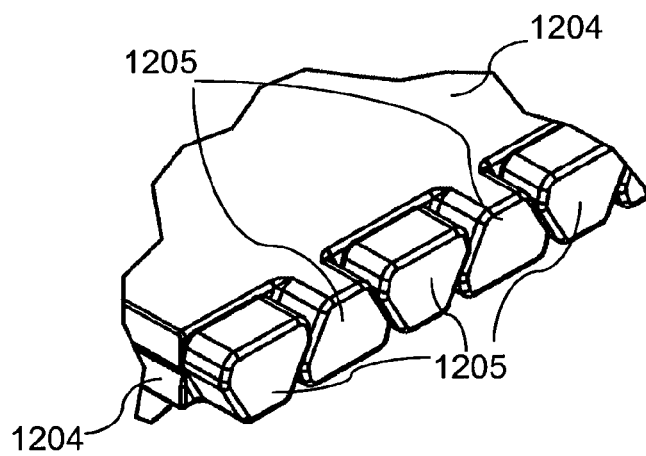
FIG. 13 shows an enlarged view of the lateral fixing bands of the shell portions of FIG. 12 in the connected condition.

The teeth 1205 are of an identical shape and arrangement on both fixing bands 1204 of a shell portion 1201, 1202. They are arranged at regular spacings or intervals so that they can engage into each other and interconnect as in a zip fastener. The teeth 1205 are of an effective cross-section which is more clearly apparent in FIG. 13 and which at least approximately corresponds to the shape of an isosceles trapezium, wherein the narrow side respectively faces away from the shell portion 1201, 1202 that is to be connected, that is to say the converging limbs when shell portions 1201, 1202 are connected wedge together, as shown in FIG. 13.

Release due to transverse forces and torsion in relation to the longitudinal direction of the line guide device 100 is thus effectively prevented. In addition, the fixing bands 1204 can be fixed together by translatory movement or force approximately perpendicularly to the longitudinal direction of the shell portions 1201, 1202, that is to say without considerable curvature of the parts.

The teeth 1205 are made integrally with the fixing bands 1204 and the plastic of the shell portions 1201, 1202. They project laterally outwardly transversely or precisely perpendicularly relative to the longitudinal direction of the line guide device 100, virtually as prolongations of the fixing bands 1204.

Figures 14A, 14B:
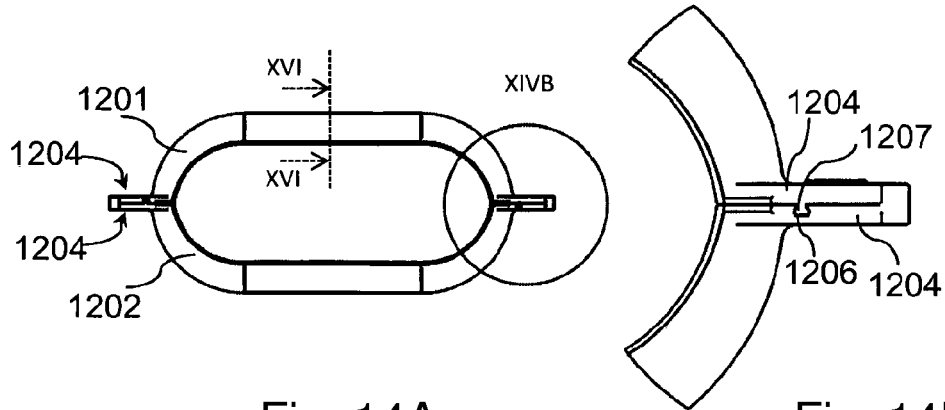
FIG. 14A shows a front view of a portion of a line guide device as shown in FIGS. 11-13.
FIG. 14B shows an enlarged view of the region XIV-B in FIG. 14A.
Figure 15:
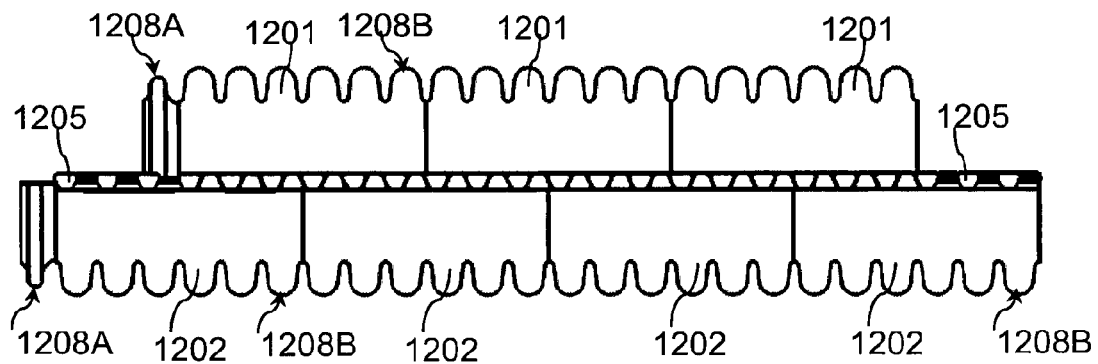
FIG. 15 shows a side view of the narrow side of a portion of a line guide device as shown in FIGS. 11-14 with shell portions connected in displaced relationship in the longitudinal direction.

FIGS. 14A-14B show in the region between the tooth arrangement with the teeth 1205 and the transition to the corrugated tube-like sheath of the shell portions 1201, 1202, a longitudinal groove 1206 in the fixing band 1204 at one side. The longitudinal groove 1206 cooperates in positively locking relationship with a corresponding tongue 1207 on the shell portion to be connected. Each shell portion 1201, 1202 can have a longitudinal groove 1206 at one side in the fixing band 1204 and a tongue 1207 in the fixing band 1204 at the other longitudinal side. The longitudinal groove 1206 and the tongue 1207 are arranged symmetrically relative to the central plane so that identical shell portions 1201 and 1202 can also be connected together by means of the tongue-and-groove connection.

The connection of the longitudinal groove 1206 and the corresponding tongue 1207 has an action in particular of enhancing the sealing integrity in relation to particle escape, in particular in relation to the curvature in the direction-changing curve.

Figure 16:
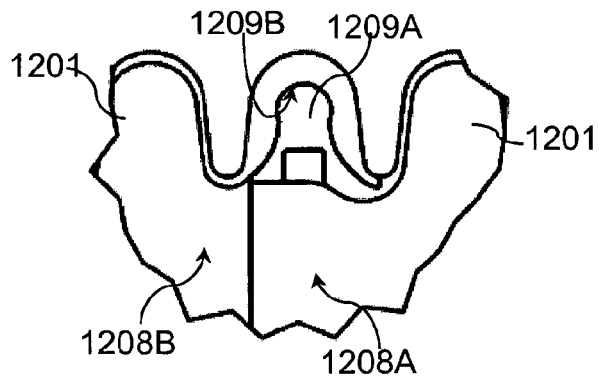
FIG. 16 shows a section along lines XVI-XVI in FIG. 14A of the sealed connection at the ends of adjacent shell portions.

Finally FIG. 16 shows as a further aspect a possible sealing arrangement for the end regions 1208A, 1208B on the shell portions 1201, 1202. A sealing projection 1209A which is directed perpendicularly to the longitudinal axis and which is peripherally continuous, of an initially converging cross-section which is thickened at the end, for example similarly to a mushroom head or a game playing piece, engages into an inwardly disposed, correspondingly extending sealing groove 1209B at the other end region 1208B. The sealing projection 1209A engages into the sealing groove 1209B in positively locking and/or force-locking relationship.

The join which can best be seen in FIG. 13 between the fixing bands 1204 here too forms the neutral fibre.

| List of references | |
| --- | --- |
| FIG. 1 | |
| 100 | line guide device |
| 101 | upper run |
| 103 | lower run |
| 104 | direction-changing curve |
| 105 | stationary connecting location |
| 107 | relatively moveable connecting location |
| 110 | sheath |
| A | direction-changing axis |
| FIGS. 2A-2C | |
| 200 | line guide device |
| 208 | internal space |
| 210 | sheath |
| 211 | inside |
| 212 | outside |
| 214 | corrugation peaks (external) |
| 215 | abutments |
| 216 | corrugation troughs (external) |
| 217 | opposite end |
| 218 | corrugation troughs (internal) |
| 219 | latching ring |

| -continued | |
| --- | --- |
| List of references | |
| 220 | corrugation peaks (internal) |
| 222 | longitudinal struttings |
| B1 | internal axial width (inside) |
| B2 | internal axial width (outside) |
| FIGS. 3A-3D | |
| 300 | line guide device |
| 308 | internal space |
| 310 | sheath |
| 311 | inside |
| 312 | outside |
| 314 | corrugation peaks (external) |
| 315 | abutments |
| 316 | corrugation troughs (external) |
| 318 | corrugation troughs (internal) |
| 320 | corrugation troughs internal) |
| 322 | longitudinal struttings |
| 331, 332 | shell portions |
| 333 | press knobs |
| 334 | receiving means |
| 335 | intersection |
| 340 | separating legs |
| B1 | internal axial width (inside) |
| B2 | internal axial width (outside) |
| FIGS. 4A-4C | |
| 400 | line guide device |
| 408 | internal space |
| 410 | corrugated tube |
| 420 | corrugation troughs |
| 440 | supporting skeleton |
| 442 | carrier |
| 444 | transverse ribs |
| 446 | extensions |
| FIG. 5 | |
| 500 | line guide device |
| 510 | corrugated tube |
| 540 | supporting skeleton |
| 542 | carrier |
| FIGS. 6A-6C | |
| 600 | line guide device |
| 608 | internal space |
| 610 | sheath |
| 611 | inside |
| 612 | outside |
| 618 | corrugation troughs |
| 620 | corrugation peaks |
| 640 | supporting skeleton |
| 642 | carrier |
| 644, 645 | transverse ribs |
| FIGS. 7A-7C | |
| 700 | line guide device |
| 710 | sheath |
| 711 | inside |
| 712 | outside |
| 731, 732 | shell portions |
| 760 | line guide |
| 762 | part or member |
| 764 | side portion |
| 766 | carrier band |
| 768 | fixing projections |
| 769 | fixing means |
| 770 | connecting leg |
| 771, 772 | T-shaped legs |
| 775, 776 | longitudinal legs |
| 778 | connector |
| FIGS. 8A-8B | |
| 800 | line guide device |
| 810 | sheath |
| 880 | connecting flange |
| 881, 882 | clamping shells |
| 883 | snap hooks |
| 884 | recesses |

-continued

| List of references | |
|---|---|
| 887 | through openings |
| 888 | connecting screws |
| 885, 886 | end regions |
| 890 | passage seal |
| FIGS. 9A-9C | |
| 940 | supporting skeleton |
| 941 | module |
| 942 | carrier bar |
| 943A, 943B | clip connector |
| 944 | transverse rib |
| 947 | holding arm |
| 948A, 948B | projection |
| 949 | recess |
| FIGS. 10A-10C | |
| 1031, 1032 | shell portion |
| 1037 | end |
| 1040 | separating leg |
| 1051, 1052 | connector |
| 1053 | apertured strip |
| 1054 | fixing band |
| FIG. 11 | |
| 1100 | line guide device |
| 1100A | first longitudinal portion |
| 1100B | second longitudinal portion |
| 1100C | third longitudinal portion |
| 1110 | sheath |
| 1131 | shell portion |
| 1132 | shell portion |
| 1141 | corrugated tube |
| FIGS. 12-16 | |
| 1201 | shell portion |
| 1202 | shell portion |
| 1204 | fixing band |
| 1205 | teeth |
| 1206 | longitudinal groove |
| 1207 | tongue |
| 1208A, 1208B | end region |
| 1209A | sealing projection |
| 1209B | sealing groove |

What is claimed is:

1. A line guide device for lines, wherein the line guide device comprises:
a first end to fix to a stationary connecting location and a second end to fix to a relatively moveable connecting location and between the first end and the second end forms an upper run, a displaceable direction-changing curve and a lower run,
wherein the direction-changing curve is curved about a direction-changing axis, and wherein the line guide device has a flexible tubular sheath that surrounds an internal space,
wherein a separate supporting skeleton is fitted externally to the sheath, and the supporting skeleton has a plurality of transverse ribs extending in a peripheral direction,
wherein, by virtue of the skeleton, the line guide device at least in a longitudinal section has an asymmetric bending behaviour in relation to curvature about the direction-changing axis and to opposite curvature,
wherein, by virtue of the skeleton, the line guide device has a permitted bending sag that is less in comparison with a desired curvature, and
wherein the supporting skeleton has two mutually opposite carriers which extend in a longitudinal direction and which carry the plurality of transverse ribs.

2. The line guide device as set forth in claim 1, wherein:
the transverse ribs include projections projecting in the longitudinal direction, wherein the projections are conjugate in shape, and
the transverse ribs are in abutting contact with each other in a straight or self-supporting position.

3. The line guide device as set forth in claim 1, wherein: the tubular sheath is configured as a corrugated tubular sheath and has a corrugated profile.

4. The line guide device as set forth in claim 3, wherein: the transverse ribs at least partially engage into the corrugated profile of the sheath.

5. The line guide device as set forth in claim 4, wherein: the supporting skeleton is configured such that one of the transverse ribs at least partially engages into at least every third corrugation of the corrugated profile, respectively.

6. The line guide device as set forth in claim 1, wherein: the supporting skeleton is formed in one piece.

7. The line guide device as set forth in claim 1, wherein: the carriers are disposed at a level of a neutral fibre of the line guide device.

8. The line guide device as set forth in claim 1, wherein: the direction-changing curve is displaceable in a plane perpendicular to the direction-changing axis.

9. The line guide device as set forth in claim 1, wherein: the carriers are fixable at both ends to the connecting locations, and carry tensile and compressive forces upon displacement of the direction-changing curve.

10. The line guide device as set forth in claim 1, wherein: the supporting skeleton has a longitudinal extent corresponding at least to a maximum length of the upper run.

11. The line guide device as set forth in claim 1, wherein: the carriers have end fixing members for concatenating longitudinally successive supporting skeletons.

12. The line guide device as set forth in claim 11, wherein: the end fixing members comprise conjugated clip connectors.

13. The line guide device as set forth in claim 1, wherein: the carriers have lateral fixing members for connection to a further supporting skeleton of a further sheath.

14. The line guide device as set forth in claim 1, wherein: the transverse ribs are flexible about the longitudinal direction and extend in a shape of a circular arc in a cross-section perpendicular to the longitudinal direction.

15. The line guide device as set forth claim 1, wherein: the sheath is formed of plastic.

16. The line guide device as set forth in claim 1, wherein: the sheath has an asymmetric bending characteristic in a first longitudinal portion and an oppositely asymmetric bending characteristic in a second longitudinal portion, and/or
the sheath has an asymmetric bending characteristic in a longitudinal portion and a symmetrical bending characteristic in another longitudinal portion.

17. The line guide device as set forth in claim 2, wherein: the projections cooperate in centring relationship.

18. The line guide device as set forth in claim 3, wherein: the supporting skeleton has flexible holding arms projecting in the peripheral direction for holding the supporting skeleton in clip-like relationship on the corrugated tubular sheath.

19. The line guide device as set forth in claim 18, wherein an intermediate spacing and a width of the holding arms in the longitudinal direction operate to limit a minimum curvature radius in the direction-changing curve.

20. The line guide device as set forth in claim 3, wherein:
the corrugated profile of the sheath is corrugated in parallel ring-shape form.

21. The line guide device as set forth in claim 3, wherein:
the supporting skeleton has wedge-shaped or V-shaped extensions which engage over a peripheral extent into the corrugated profile, and which predetermine a minimum curvature radius of the direction-changing curve.

22. The line guide device as set forth in claim 3, wherein:
the sheath itself guides and carries the lines and/or in comparison with a desired concave curvature about the direction-changing axis, the corrugated tubular sheath permits only a very slight or substantially no convex bending sag.

23. The line guide device as set forth claim 3, wherein:
a static convex bending sag is limited to a radius which is a multiple, in particular at least 10 times, greater than a static bending radius of the corrugated tubular sheath upon concave curvature.

24. A module for a supporting skeleton for producing a line guide device using a corrugated tube with a corrugated profile, comprising:
the module formed in one piece of plastic, having a longitudinal extent and fitable from an outside to the corrugated tube, wherein the module has a plurality of transverse ribs extending in a peripheral direction transversely relative to the longitudinal extent, wherein the module has two mutually opposite carriers which extend in a longitudinal direction and which carry the transverse ribs, and wherein the transverse ribs are at least partially engageable into the corrugated profile of the corrugated tube, or wherein the transverse ribs include projections projecting in the longitudinal direction such that the transverse ribs are in abutting contact with each other in a straight or self-supporting position.

25. A kit of parts of a line guide device, the kit comprising:
a corrugated tube that surrounds an internal space, a separate supporting skeleton to be fitted externally to the corrugated tube for achieving or enhancing an asymmetric bending behaviour in relation to curvature about a direction-changing axis and to opposite curvature, and wherein the supporting skeleton has a plurality of transverse ribs which extend in a peripheral direction and two mutually opposite carriers which extend in a longitudinal direction and which carry the plurality of transverse ribs.

* * * * *